(12) United States Patent
McBeath et al.

(10) Patent No.: US 9,119,195 B2
(45) Date of Patent: Aug. 25, 2015

(54) SYSTEM AND METHOD FOR SHARING A CONTROL CHANNEL FOR CARRIER AGGREGATION

(75) Inventors: Sean Michael McBeath, Keller, TX (US); Andrew Mark Earnshaw, Kanata (CA); Mo-Han Fong, Sunnyvale, CA (US); Youn Hyoung Heo, Hwasung-si (KR); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 158 days.

(21) Appl. No.: 13/695,378

(22) PCT Filed: May 2, 2011

(86) PCT No.: PCT/US2011/034855
§ 371 (c)(1),
(2), (4) Date: Feb. 19, 2013

(87) PCT Pub. No.: WO2011/137455
PCT Pub. Date: Nov. 3, 2011

(65) Prior Publication Data
US 2013/0142142 A1 Jun. 6, 2013

Related U.S. Application Data

(60) Provisional application No. 61/330,157, filed on Apr. 30, 2010.

(51) Int. Cl.
*H04W 4/00* (2009.01)
*H04W 72/04* (2009.01)
*H04L 5/00* (2006.01)

(52) U.S. Cl.
CPC ............. *H04W 72/042* (2013.01); *H04L 5/003* (2013.01)

(58) Field of Classification Search
CPC ............................ H04L 5/003; H04W 72/042
See application file for complete search history.

(56) References Cited

U.S. PATENT DOCUMENTS

| | | | |
|---|---|---|---|
| 2009/0088148 A1* | 4/2009 | Chung et al. | 455/423 |
| 2009/0154607 A1* | 6/2009 | Lindoff et al. | 375/341 |
| 2010/0232373 A1* | 9/2010 | Nory et al. | 370/329 |
| 2010/0254329 A1 | 10/2010 | Pan et al. | |
| 2011/0110315 A1 | 5/2011 | Chen et al. | |
| 2011/0110316 A1 | 5/2011 | Chen et al. | |

(Continued)

OTHER PUBLICATIONS

Office Action issued in Japanese Application No. 2013-508093 on Dec. 5, 2013; 7 pages.

(Continued)

*Primary Examiner* — David Oveissi
(74) *Attorney, Agent, or Firm* — Fish & Richardson P.C.

(57) ABSTRACT

A method for processing a control channel at a user agent (UA) to identify at least one of an uplink and a downlink resource allocated by a resource grant within a multi-carrier communication system wherein resource grants are specified by control channel element (CCE) subset candidates wherein the carriers used for data transmission and reception are configured carriers, the method comprising the steps of receiving activation signals specifying active and deactivated carriers from among the configured carriers, for active carriers (i) identifying a number of CCE subset candidates to decode and (ii) decoding up to the identified number of CCE subset candidates in an attempt to identify the resource grant; and for deactivated carriers, ignoring CCE subset candidates associated with the deactivated carriers.

14 Claims, 24 Drawing Sheets

(56) References Cited

U.S. PATENT DOCUMENTS

2011/0128922 A1 6/2011 Chen et al.
2011/0201333 A1 8/2011 Kwon et al.

OTHER PUBLICATIONS

3GPP TS 36.213 V8.7.0 (May 2009); 3rd Generation Partnership Project; Technical Specification Group Radio Access Network; Evolved Universal Terrestrial Radio Access (E-UTRA); Physical Layer Procedures (Release 8); May 2009; 6 pages.
Office Action issued in Canadian Application No. 2,797,400 on Feb. 25, 2014; 3 pages.
Office Action issued in Japanese Application No. 2012-515228 on Jan. 23, 2014; 3 pages. No translation.
Notice of Allowance issued in Japanese Application No. 2013-508093 on Apr. 11, 2014; 3 pages.
Alcatel-Lucent, Alcatel-Lucent Shanhai Bell; "Discussion of Carrier Indicator Signalling in Carrier Aggregation Scenario"; 3GPP TSG RAN WG1 #59bis Meeting (R1-10-0410); Valencia, Spain; Jan. 18-22, 2010; 4 pages.
Catt, Ritt, Potevio; "Design of DL Control Channel for LTE-A with Carrier Aggregation"; 3rd Generation Partnership Program (3GPP) TSG-RAN WG1 Meeting #58 (R1-093530); Shenzhen, China; Aug. 24-28, 2009; 4 pages.
CMCC; "Consideration on Reducing Blind Decoding Attempts for Separate PDCCH Design"; TSG-RAN1 #56bis; Seoul, Korea; Mar. 23-27, 2009; 6 pages.
CMCC; "Resource Allocation and PDCCH Design Issues in Carrier Aggregation"; 3rd Generation Partnership Project (3GPP) TSG-RAN WG1 #56 (R1-090924); Athens, Greece; Feb. 9-13, 2009; 6 pages.
Huawei; "PDCCH Design for Carrier Agreegation"; 3rd Generation Partnership Project (3GPP) TSG RAN WG1 Meeting #56 (R1-090815); Athens, Greece; Feb. 9-13, 2009; 6 pages.
LG Electronics; "Configuration and Activation of Carrier Indiator Field in PDCCH for Multiple Carrier Aggregation"; 3GPP TSG RAN WG1 #59 (R1-094468); Jeju, Korea; Nov. 9-13, 2009; 6 pages.
LG Electronics; "PDCCH Structure for Multiple Carrier Aggregation in LTE-Advanced"; 3rd Generation Partnership Project (3GPP) TSG RAN WG1 #57 (R1-091697); San Francisco, California; May 4-8, 2009; 9; 9 pages.
Motorola; "Control Channel Structure Extension for Post-Release 8 LTE"; 3rd Generation Partnership Project (3GPP) TSG RAN1 #57a (R1-091944); San Francisco, California; May 4-8, 2009; 4 pages.
NEC; "Component Carrier Configuration/Activation for Carrier Aggregation"; 3rd Generation Partnership Project (3GPP) TSG RAN2 Meeting #66bis (R2-093697); Los Angeles, California; Jun. 29-Jul. 3, 2009; 3 pages.
Nokia et al.; "Handling DCI Formats and Blind Decoding in LTE-Advanced"; 3rd Generation Partnership Project (3GPP) TSG-RAN WG1 Meeting #57 (R1-091770); San Francisco, California; May 4-8, 2009; 8 pages.
Nokia Siemens Networks, Nokia Corporation; "DRX in Carrier Aggregation—Active Time"; 3rd Generation Partnership Project (3GPP) TSG-RAN WG2 Meeting #69 (R2-101527); San Francisco, California; Feb. 22-26, 2010; 4 pages.
Panasonic; "Further Discussion on PDCCH with Cross Carrier Operation"; 3GPP TSG RAN WG1 Meeting #59bis (R1-100361); Valencia, Spain; Jan. 18-22, 2010; 6 pages.
Panasonic; "PDCCH Coding and Mapping for Carrier Aggregation"; 3rd Generation Partnership Project (3GPP) TSG-RAN WG1 Meeting #56bis (R1-091168); Seoul, Korea; Mar. 23-27, 2009; 6 pages.
Samsung; "Component Carrier Activation and Deactivation"; 3rd Generation Partnership Project (3GPP) TSG-RAN WG1 Meeting #60 (R1-101144); San Francisco, California; Feb. 22-26, 2010; 5 pages.
Office Action issued in U.S. Appl. No. 12/816,104 on Oct. 1, 2012; 14 pages.
Office Action issued in U.S. Appl. No. 12/816,120 on Jan. 18, 2012; 11 pages.
Office Action issued in U.S. Appl. No. 12/816,120 on Aug. 3, 2012; 15 pages.
Notice of Allowance issued in U.S. Appl. No. 12/816,120 on Oct. 3, 2012; 11 pages.
Office Action issued in Canadian Application No. 2,760,431 on Aug. 24, 2012; 3 pages.
International Search Report and Written Opinion of the International Searching Authority issued in International Application No. PCT/US2010/038674 on Oct. 4, 2010; 11 pages.
Written Opinion of the International Preliminary Examining Authority issued in International Application No. PCT/US2010/038674 on Jun. 7, 2011; 7 pages.
International Search Report and Written Opinion of the International Searching Authority issued in International Application No. PCT/US2010/038684 on Oct. 5, 2010; 10 pages.
International Preliminary Report on Patentability under Chapter I issued in International Application No. PCT/US2010/038684 on Dec. 29, 2011; 8 pages.
Partial International Search Report issued in International Application No. PCT/US2011/034855 on Jul. 27, 2011; 4 pages.
International Search Report and Written Opinion of the International Searching Authority issued in International Application No. PCT/US2011/034855 on Oct. 26, 2011; 17 pages.
Notice of Allowance issued in Canadian Application No. 2,760,431 on Dec. 14, 2012; 1 page.
International Preliminary Report on Patentability under Chapter I issued in International Application No. PCT/US2011/034855 on Nov. 15, 2012; 12 pages.
Ericsson; Carrier Aggregation in LTE-Advanced: R1-082468, Jun. 2008.
Office Action issued in U.S. Appl. No. 12/816,104 on Mar. 7, 2013; 14 pages.
Office Action issued in Japanese Application No. 2012-515228 on Apr. 17, 2014; 5 pages.
Office Action issued in Chinese Application No. 201080036242.6 on Jul. 2, 2014; 6 pages. No translation.
Office Action issued in Korean Application No. 10-2012-7031262 on Jul. 24, 2014; 4 pages. No translation.

\* cited by examiner

| Type | Search Space $S^{(L)}_{k,c}$ | | Number Of PDCCH Candidates $M^{(L)}$ |
|---|---|---|---|
| | Agg Level L | Size (in CCEs) | |
| UA Specific Search Space | 1 | 6 | 6 |
| | 2 | 12 | 6 |
| | 4 | 8 | 2 |
| | 8 | 16 | 2 |
| Common Search Space | 4 | 16 | 4 |
| | 8 | 16 | 2 |

Fig. 4

| Type | Search Space $S^{(L)}_{k,c}$ | |
|---|---|---|
| | Agg Level L | Size (in CCEs) |
| UA Specific Search Space | 1 | N |
| | 2 | 2xN |
| | 4 | 4xN |
| | 8 | 8xN |

Fig. 10

| Type | Search Space $S_{k,c}^{(L)}$ | | Number Of PDCCH Candidates $M^{(L)}$ |
|---|---|---|---|
| | Agg Level L | Size (in CCEs) | |
| UA Specific Search Space | 1 | max(N,6) | max(N,6) |
| | 2 | 2 × max(N,6) | max(N,6) |
| | 4 | 4 × max(N,2) | max(N,2) |
| | 8 | 4 × max(N,2) | max(N,2) |

Fig. 17

| Type | Search Space $S_{k,c}^{(L)}$ | | Number Of PDCCH Candidates $M^{(L)}$ |
|---|---|---|---|
| | Agg Level L | Size (in CCEs) | |
| UA Specific Search Space | 1 | max(2xN,6) | max(2xN,6) |
| | 2 | 2 x max (2xN,6) | max(2xN,6) |
| | 4 | 4 x max(2xN,2) | max(2xN,2) |
| | 8 | 8 x max(2xN,2) | max(2xN,2) |

Fig. 18

| Type | Search Space $S^{(L)}_{k,c}$ | | | Number Of PDCCH Candidates $M^{(L)}$ | |
|---|---|---|---|---|---|
| | Agg Level L | Size (in CCEs) | | | |
| | | N=1 | N>1 | N=1 | N>1 |
| UA Specific Search Space | 1 | 6 | M1 | 6 | M1 |
| | 2 | 12 | 2xM2 | 6 | M2 |
| | 4 | 8 | 4xM3 | 2 | M3 |
| | 8 | 16 | 8xM4 | 2 | M4 |

Fig. 19

| Type | Search Space $S^{(L)}_{k,c}$ | | Number Of PDCCH Candidates $M^{(L)}$ | |
|---|---|---|---|---|
| | Agg Level L | Size (in CCEs) | | |
| | | N=1 | N>1 | N=1 | N>1 |
| UA Specific Search Space | 1 | A1 | A1 + B1x(N-1) | A1 | C1 = A1 + B1x(N-1) |
| | 2 | A2 | 2x(A2 + B2x(N-1)) | A2 | C2 = A2 + B2x(N-1) |
| | 4 | A3 | 4x(A3 + B3x(N-1)) | A3 | C3 = A3 + B3x(N-1) |
| | 8 | A4 | 8x(A4 + B4x(N-1)) | A4 | C4 = A4 + B4x(N-1) |

Fig. 20

SYSTEM AND METHOD FOR SHARING A CONTROL CHANNEL FOR CARRIER AGGREGATION

CLAIM OF PRIORITY

This application is a 371 U.S. National Stage Entry of International Application No. PCT/US2011/034855 filed on May 2, 2011, which claims priority to U.S. Provisional Application Ser. No. 61/330,157 filed on Apr. 30, 2010, the entire contents of which are hereby incorporated by reference.

BACKGROUND

The present disclosure relates generally to data transmission in mobile communication systems and more specifically to methods for sharing a control channel for carrier aggregation.

As used herein, the term "user agent" (UA) can refer to wireless devices such as mobile telephones, personal digital assistants, handheld or laptop computers, and similar devices or other User Equipment ("UE") that have telecommunications capabilities. In some embodiments, a UA may refer to a mobile, wireless device. The term "UA" may also refer to devices that have similar capabilities but that are not generally transportable, such as desktop computers, set-top boxes, or network nodes.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) that is highly evolved compared to the corresponding equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems/equipment will eventually result in an LTE advanced (LTE-A) system. As used herein, the term "access device" will refer to any component, such as a traditional base station or an LTE or LTE-A access device (including eNBs), that can provide a UA with access to other components in a telecommunications system.

In mobile communication systems such as E-UTRAN, an access device provides radio access to one or more UAs. The access device comprises a packet scheduler for dynamically scheduling downlink traffic data packet transmissions and allocating uplink traffic data packet transmission resources among all the UAs communicating with the access device. The functions of the scheduler include, among others, dividing the available air interface capacity between UAs, deciding the transport channel to be used for each UA's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UAs through a scheduling channel.

Several different data control information (DCI) message formats are used to communicate resource assignments to UAs including, among others, a DCI format 0 for specifying uplink resources, DCI formats 1, 1A, 1B, 1C, 1D, 2 and 2A for specifying downlink resources, and DCI formats 3 and 3A for specifying power control information. Uplink specifying DCI format 0 includes several DCI fields, each of which includes information for specifying a different aspect of allocated uplink resources. Exemplary DCI format 0 DCI fields include a transmit power control (TPC) field, a cyclic shift for demodulation reference signal (DM-RS) field, a modulation and coding scheme (MCS) and redundancy version field, a New Data Indicator (NDI) field, a resource block assignment field and a hopping flag field. The downlink specifying DCI formats 1, 1A, 2 and 2A each include several DCI fields that include information for specifying different aspects of allocated downlink resources. Exemplary DCI format 1, 1A, 2 and 2A DCI fields include a hybrid automatic repeat request (HARQ) process number field, an MCS field, a New Data Indicator (NDI) field, a resource block assignment field and a redundancy version field. Each of the DCI formats 0, 1, 2, 1A and 2A includes additional fields for specifying allocated resources. Other downlink formats 1B, 1C and 1D include similar information. The access device selects one of the downlink DCI formats for allocating resources to a UA as a function of several factors including UA and access device capabilities, the amount of data a UA has to transmit, the communication (channel) condition, the transmission mode to be used, the amount of communication traffic within a cell, etc.

DCI messages are synchronized with sub-frames so that they can be associated therewith implicitly as opposed to explicitly, which reduces control overhead requirements. For example, in LTE frequency division duplex (FDD) systems, a DCI message for uplink resource is associated with an uplink sub-frame four milliseconds later so that, for example, when a DCI message is received the first time, the UA is programmed to use the resource grant indicated therein to transmit a data packet in the sub-frame four milliseconds after the first time. Similarly, a DCI message for downlink resource is associated with a simultaneously transmitted downlink sub-frame. For example, when a DCI message is received the first time, the UA is programmed to use the resource grant indicated therein to decode a data packet in a simultaneously received traffic data sub-frame.

During operation, LTE networks use a shared Physical Downlink Control CHannel (PDCCH) to distribute DCI messages amongst UAs. The DCI messages for each UA, as well as other shared control information, are separately encoded. In LTE, PDCCHs are transmitted in the first few orthogonal frequency division multiplexing (OFDM) symbols over the whole system bandwidth, which can be called a PDCCH region. The PDCCH region includes a plurality of control channel elements (CCEs) that are used to transmit DCI messages from an access device to UAs. An access device selects one or an aggregation of CCEs to be used to transmit a DCI message to a UA; the CCE subset selected to transmit a message depends at least in part on perceived communication conditions between the access device and the UA. For example, where a high-quality communication link is known to exist between an access device and a UA, the access device may transmit data to the UA via a single one of the CCEs and, where the link is of low quality, the access device may transmit data to the UA via a subset of two, four or even eight CCEs, where the additional CCEs facilitate a more robust transmission of an associated DCI message. The access device may select CCE subsets for DCI message transmission based on many other criteria.

Because a UA does not know exactly which CCE subset or subsets are used by an access device to transmit DCI messages to the UA, in existing LTE networks, the UA is programmed to attempt to decode many different CCE subset candidates when searching for a DCI message. For instance, a UA may be programmed to search a plurality of single CCEs for DCI messages and a plurality of two CCE subsets, four CCE subsets, and eight CCE subsets, to locate a DCI message. To reduce the possible CCE subsets that need to be searched, access devices and UAs may be programmed so that each access device only uses specific CCE subsets to transmit DCI messages to a specific UA corresponding to a specific data traffic sub-frame, so that the UA knows which CCE subsets to search. For instance, in current LTE networks, for each data traffic sub-frame, a UA searches six single CCEs, six 2-CCE subsets, two 4-CCE subsets and two 8-CCE subsets for DCI messages, for a total of sixteen CCE subsets. The sixteen CCE subsets are a function of a specific Radio Network Temporary Identifier (RNTI) assigned to a UA 10 and vary from one sub-frame to the next. This search space that is specific to a given UA is referred to hereinafter as "UA specific search space".

In many cases, it is desirable for an access device to transmit a large amount of data to a UA or for a UA to transmit large amounts of data to an access device in a short amount of time. For instance, a series of pictures may have to be transmitted to an access device over a short amount of time. In another instance, a UA may run several applications that all have to receive data packets from an access device essentially simultaneously so that the combined data transfer is extremely large. One way to increase the rate of data transmission is to use multiple carriers (i.e., multiple frequencies) to communicate between an access device and UAs, as is the case for LTE-A. For example, a system may support five different carriers (i.e., frequencies) and eight HARQ processes, so that five separate eight uplink HARQ and five separate eight downlink HARQ transmission streams can be generated in parallel. Communication via multiple carriers is referred to as carrier aggregation.

In the case of carrier aggregation, a control-channel structure is allocated to each carrier for distributing DCI control messages. As a simple way, each carrier can include a separate PDCCH region allowing control channel information to be communicated between the access device and UAs for each carrier independently. This approach, while allowing for control channel information to be distributed for each carrier, requires the allocation of a substantial amount of resources on each carrier. Furthermore, because the level of interference varies amongst carriers, it may be difficult to implement PDCCH regions on all carriers equally. In some cases, for example, the interference levels on a particular carrier may be so substantial as to make it difficult or impossible to implement a PDCCH region on that carrier. Alternatively, the DCI message format for control messages on a first carrier may be modified to provide an additional field for indicating a specific carrier associated with each DCI message.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a table showing aggregation levels for different UA-specific and common search spaces;

FIG. 10 is a table showing aggregation levels for a UA-specific space, the size of each aggregation level in number of CCEs, and an extended number of PDCCH (CCE subset) candidates to be searched at each aggregation level;

FIG. 17 is a table showing aggregation levels for a UA-specific space, the size of each aggregation level in number of CCEs, and an extended number of PDCCH (CCE subset) candidates to be searched at each aggregation level that are consistent with at least one embodiment of the present description;

FIG. 18 is a table showing aggregation levels for a UA-specific space, the size of each aggregation level in number of CCEs, and an extended number of PDCCH (CCE subset) candidates to be searched at each aggregation level that are consistent with at least one embodiment of the present description;

FIG. 19 is a table showing aggregation levels for a UA-specific space, the size of each aggregation level in number of CCEs, and an extended number of PDCCH (CCE subset)

candidates to be searched at each aggregation level that are consistent with at least one embodiment of the present description;

FIG. 20 is a table showing aggregation levels for a UA-specific space, the size of each aggregation level in number of CCEs, and an extended number of PDCCH (CCE subset) candidates to be searched at each aggregation level that are consistent with at least one embodiment of the present description.

Figure 21:
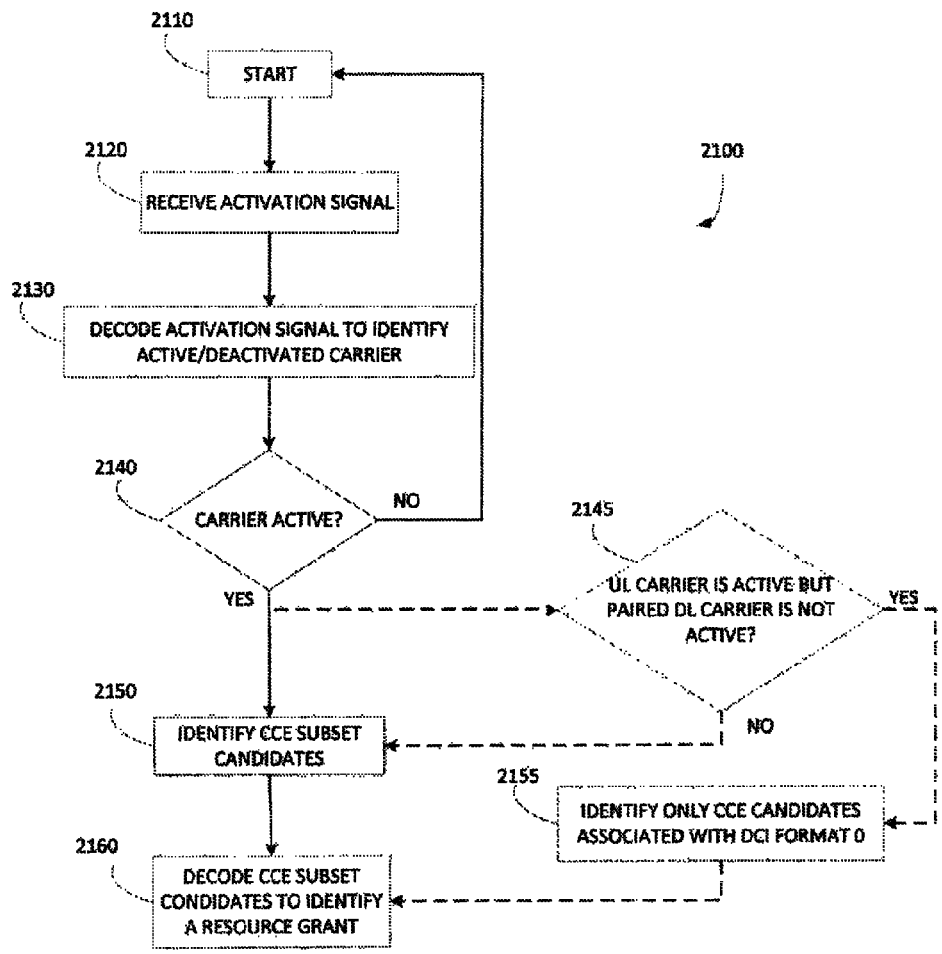
Figure 22A:
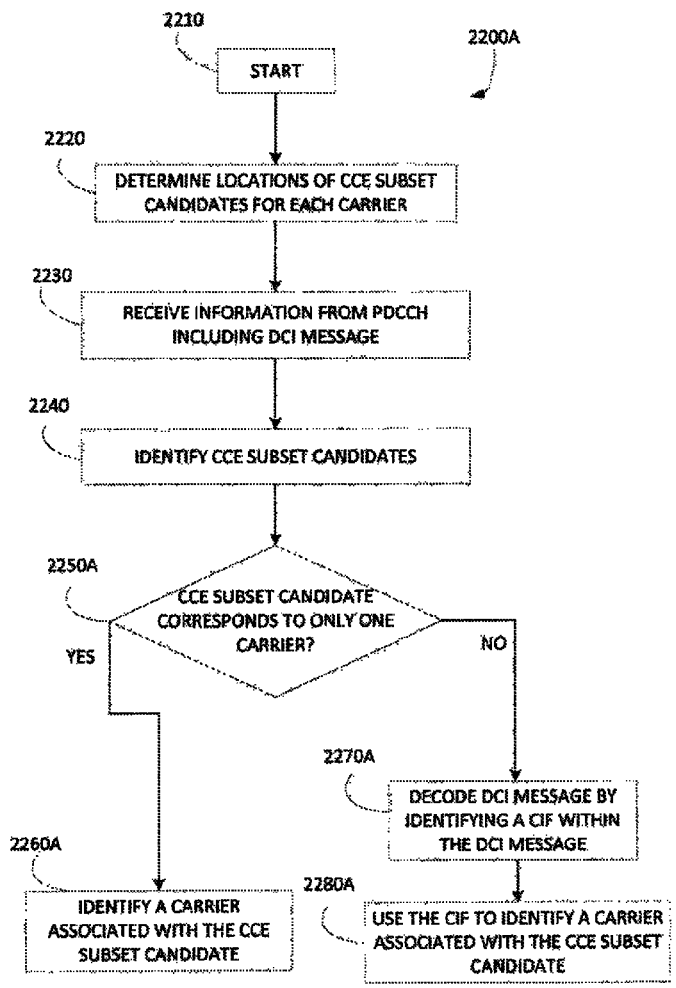
Figure 22B:
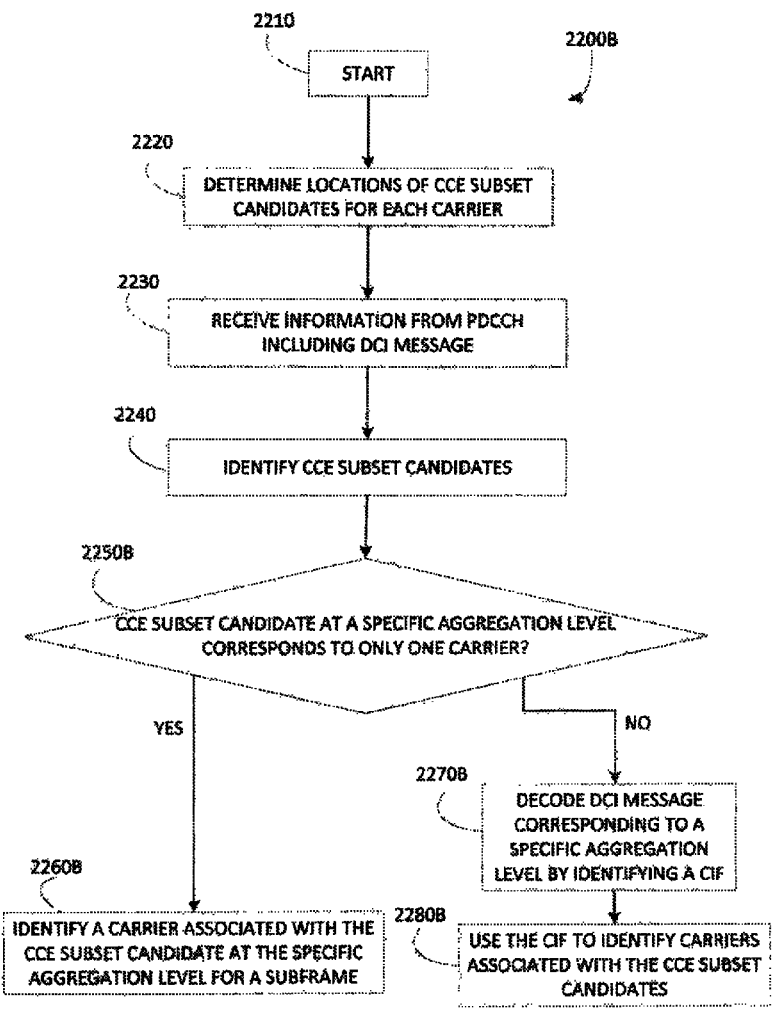
Figure 22C:
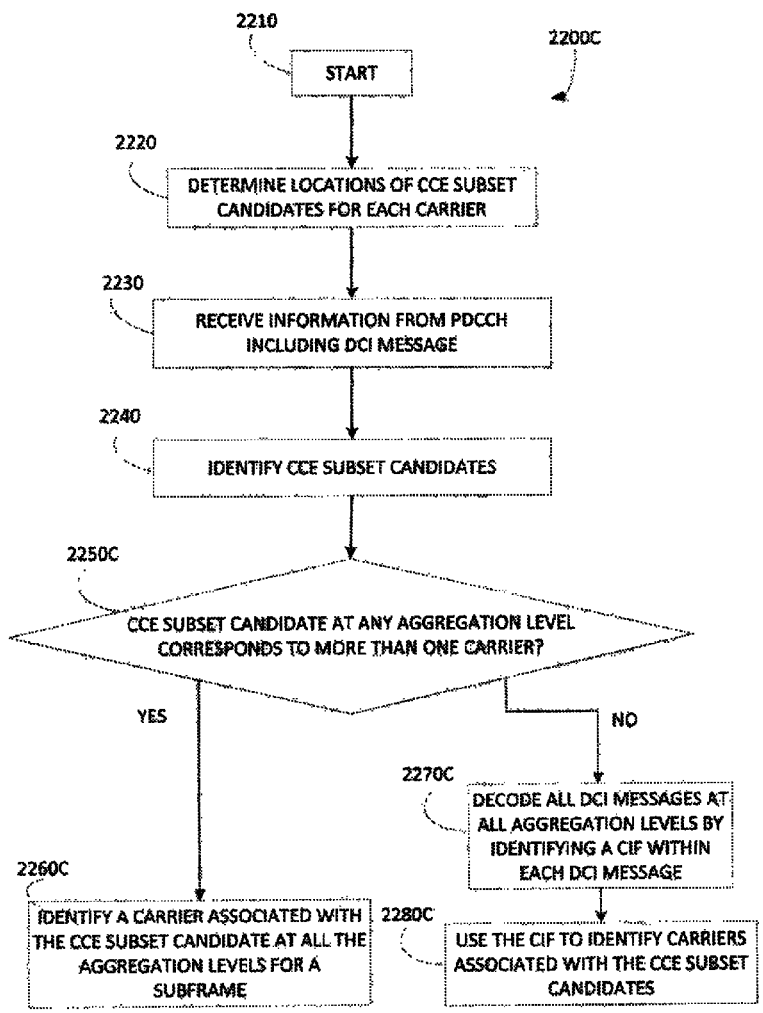

FIG. 21 is a flowchart showing an example method for identifying a resource grant of one or more carriers based on activation signals;

FIG. 22A is a flowchart showing an example method for identifying a resource grant of one or more carriers based on a carrier identification field;

FIG. 22B is a flowchart showing an example method for identifying a resource grant of one or more carriers based on a carrier identification field (CIF) within each DCI message corresponding to a specific aggregation level; and FIG. 22C is a flowchart showing an example method for identifying a resource grant of one or more carriers based on a CIF within each DCI message corresponding to all aggregation levels.

DETAILED DESCRIPTION

It has been recognized that a control channel may be shared amongst two or more carriers in multi-carrier communication network systems.

This disclosure provides various embodiments of systems, software and methods for processing a control channel. In some aspects, a method is disclosed to perform operations for processing a control channel at a user agent (UA) to identify at least one of an uplink and a downlink resource allocated by a resource grant within a multi-carrier communication system, wherein resource grants are specified by control channel element (CCE) subset candidates, and wherein the carriers used for data transmission and reception are configured carriers. In one embodiment, the method comprises receiving activation signals specifying active and deactivated carriers from among the configured carriers. For active carriers, a number of CCE subset candidates are identified to decode and up to the identified number of CCE subset candidates are decoded in an attempt to identify the resource grant. For inactivated carriers, the associated CCE subset candidates are ignored.

In some embodiments, the activation signals may indicate that an uplink carrier is active and that a corresponding paired downlink carrier is deactivated, and the step of identifying CCE subset candidates can further include identifying only candidates associated with data control information (DCI) 0 format for the active uplink carrier for decoding.

In some aspects, a method is disclosed to perform operations for processing a control channel at a UA to identify at least one of an uplink and a downlink resource allocated by a resource grant within a multi-carrier communication system, wherein resource grants are specified by CCE subset candidates. In one embodiment, the method comprises determining the locations of CCE subset candidates for each carrier, receiving a DCI message, and when a CCE subset candidate corresponds to more than one carrier, decoding the DCI message by identifying a CIF within the DCI message, and using the CIF to identify a carrier associated with the CCE subset candidate. When a CCE subset candidate only corresponds to one carrier, using the location of the CCE subset candidate within a search space to identify a carrier associated with the CCE subset candidate.

In another embodiment, the method comprises determining the locations of CCE subset candidates for each carrier, receiving a DCI message, and when a CCE subset candidate at a specific aggregation level corresponds to more than one carrier, decoding all DCI messages corresponding to the specific aggregation level for a subframe by identifying a CIF within each DCI message, and using the CIFs to identify carriers associated with the CCE subset candidates. When each CCE subset candidates at a specific aggregation level only corresponds to one carrier, using the locations of the CCE subset candidates within a search space to identify a carrier associated with each CCE subset candidate at the specific aggregation level for a subframe.

In yet another embodiment, the method comprises determining the locations of CCE subset candidates for each carrier, receiving a DCI message, and when a CCE subset candidate at any aggregation level corresponds to more than one carrier for a subframe, decoding all DCI messages at all aggregation levels for the subframe by identifying a CIF within each DCI message, and using the CIFs to identify carriers associated with the CCE subset candidates; and when each CCE subset candidate at all aggregation levels for a subframe only corresponds to one carrier, using the locations of the CCE subset candidates within a search space to identify carriers associated with each CCE subset candidate at all the aggregation levels for a subframe.

To accomplish the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the disclosure can be employed. Other aspects, advantages and novel features of the disclosure will become apparent from the following detailed description of the disclosure when considered in conjunction with the drawings.

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," and the like, are intended to refer to a computer-related entity, either hardware, a combination of hardware and software, software, or software in execution. For example, a component may be, but is not limited to being, a process running on a processor, a processor, an object, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer- or processor-based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In general, the inventive system and methods have been developed to share a single control channel resource such as a Physical Downlink Control CHannel (PDCCH) region amongst two or more carriers. As such, the system provides a multi-carrier control structure allowing downlink control information (DCI) control messages distributed via one PDCCH region to determine resource allocations on one or more carriers. In general, the present system may be implemented using existing DCI control message formats described above. As such, the lengths of the existing DCI formats, even after implementation of the present system, may remain unchanged.

Figure 1:
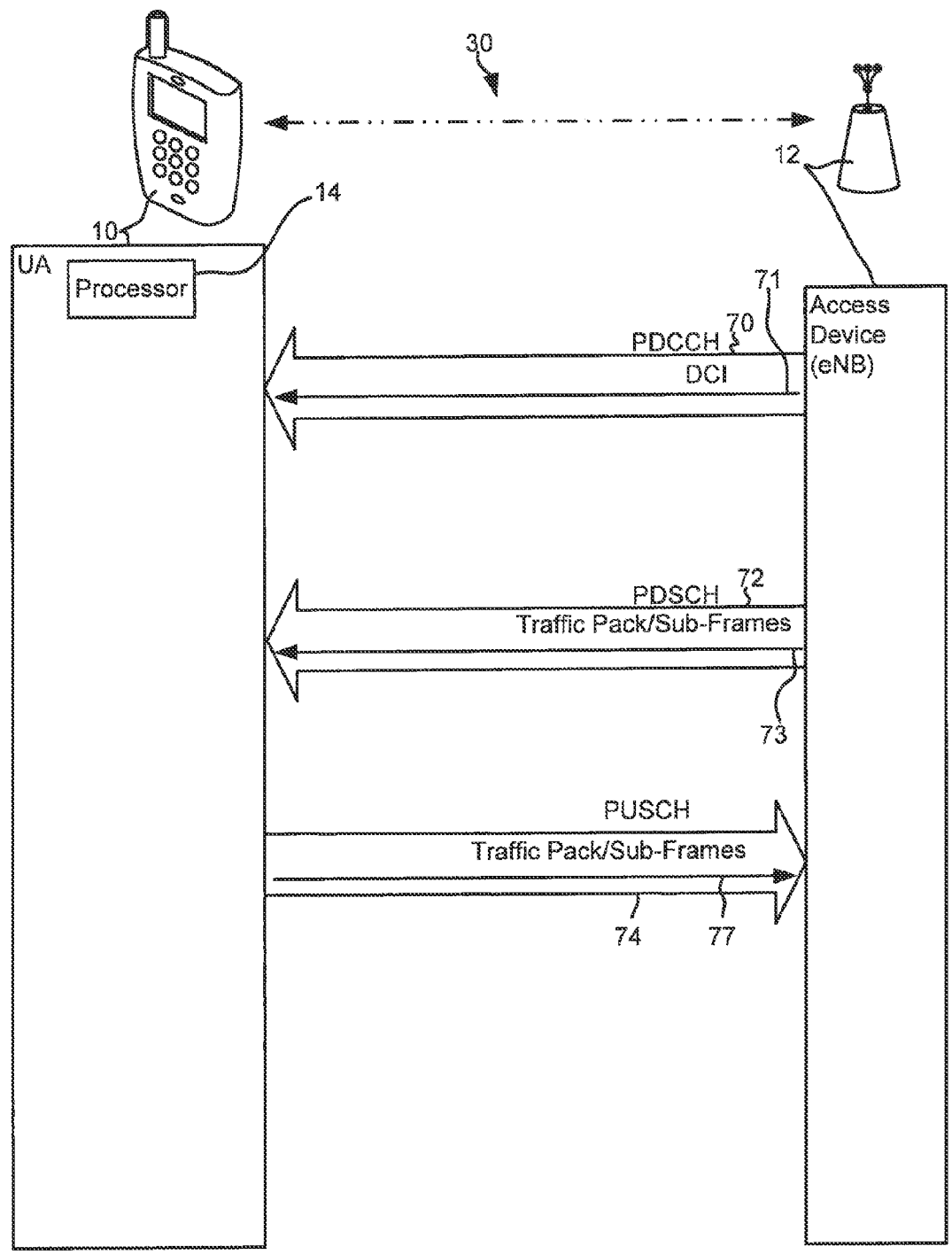
FIG. 1 is a schematic diagram showing components of a communication system including a user agent (UA) for sharing a control channel for carrier aggregation.

Referring now to the drawings wherein like reference numerals correspond to similar elements throughout the several views, FIG. 1 is a schematic diagram illustrating an exemplary multi-channel communication system 30 including a user agent (UA) 10 and an access device 12. UA 10 includes, among other components, a processor 14 that runs one or more software programs, wherein at least one of the programs communicates with access device 12 to receive data from, and to provide data to, access device 12. When data is transmitted from UA 10 to device 12, the data is referred to as uplink data, and when data is transmitted from access device 12 to UA 10, the data is referred to as downlink data. Access device 12, in one implementation, may include an E-UTRAN node B (eNB) or other network component for communicating with UA 10.

To facilitate communications, a plurality of different communication channels are established between access device 12 and UA 10. For the purposes of the present disclosure, referring to FIG. 1, the important channels between access device 12 and UA 10 include a PDCCH 70, a Physical Downlink Shared CHannel (PDSCH) 72 and a Physical Uplink Shared CHannel (PUSCH) 74. As the label implies, the PDCCH is a channel that allows access device 12 to control UA 10 during downlink data communications. To this end, the PDCCH is used to transmit scheduling or control data packets referred to as DCI packets to the UA 10 to indicate scheduling to be used by UA 10 to receive downlink communication traffic packets or transmit uplink communication traffic packets or to send specific instructions to the UA (e.g. power control commands, an order to perform a random access procedure, or a semi-persistent scheduling activation or deactivation). A separate DCI packet may be transmitted by access device 12 to UA 10 for each traffic packet/sub-frame transmission.

Exemplary DCI formats include DCI format 0 for specifying uplink resources and DCI formats 1, 1A, 1B, 1C, 1D, 2 and 2A for specifying downlink resources. Other DCI formats are contemplated. Exemplary DCI packets are indicated by communication 71 on PDCCH 70 in FIG. 1.

Referring still to FIG. 1, exemplary traffic data packets or sub-frames on PDSCH 72 are labeled 73. The PUSCH 74 may be used by UA 10 to transmit data sub-frames or packets to access device 12. Exemplary traffic packets on PUSCH 74 are labeled 77.

Figure 2:
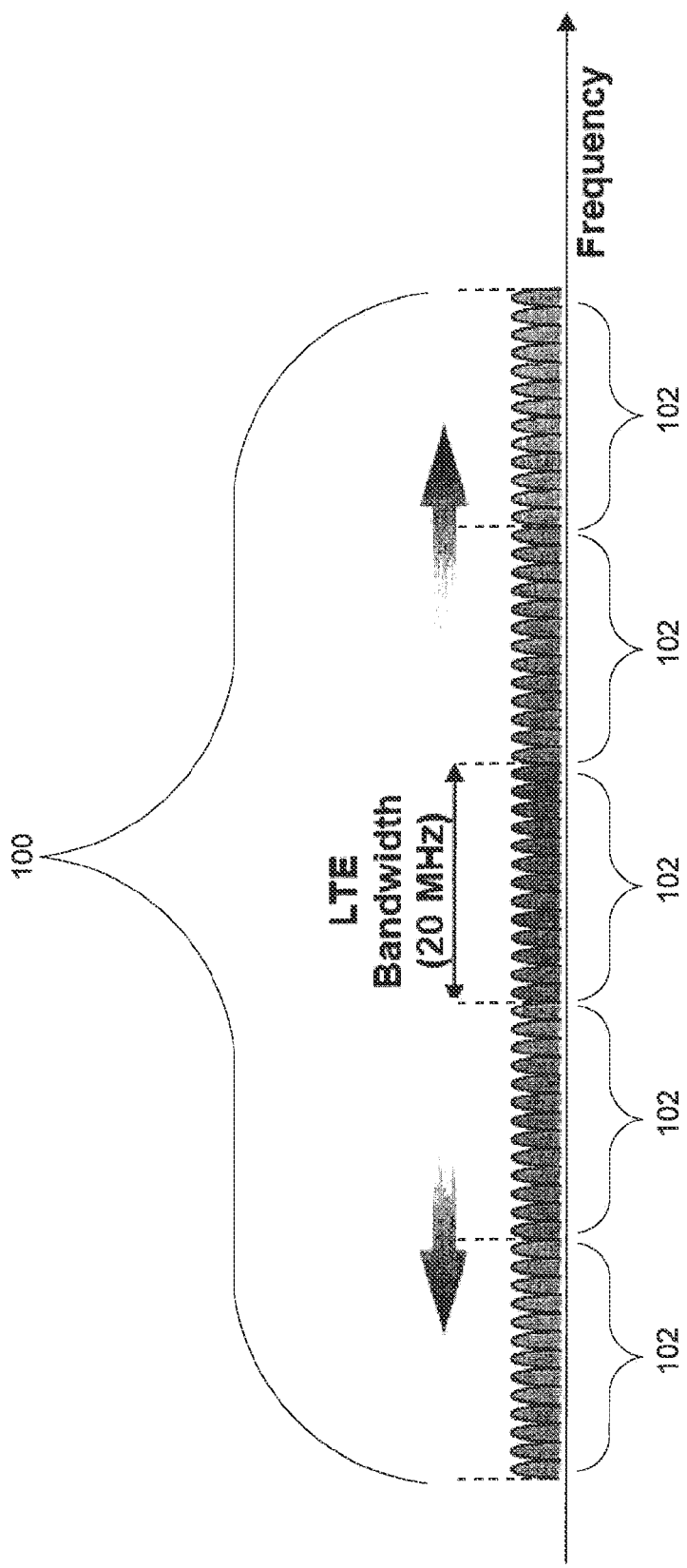
FIG. 2 is an illustration of carrier aggregation in a communications network where each component carrier has a bandwidth of 20 MHz and the total system bandwidth is 100 MHz.

Carrier aggregation can be used to support wider transmission bandwidths and increase the potential peak data rate for communications between UA 10, access device 12 and/or other network components. In carrier aggregation, multiple component carriers are aggregated and may be allocated in a sub-frame to a UA 10 as shown in FIG. 2. FIG. 2 shows carrier aggregation in a communications network where each component carrier has a bandwidth of 20 MHz and the total system bandwidth is 100 MHz. As illustrated, the available bandwidth 100 is split into a plurality of carriers 102. UA 10 may receive or transmit on multiple component carriers (up to a total of five carriers 102 in the example shown in FIG. 2), depending on the UA's capabilities. In some cases, depending on the network deployment, carrier aggregation may occur with carriers 102 located in the same band and/or carriers 102 located in different bands. For example, one carrier 102 may be located at 2 GHz and a second aggregated carrier 102 may be located at 800 MHz.

Figure 3:
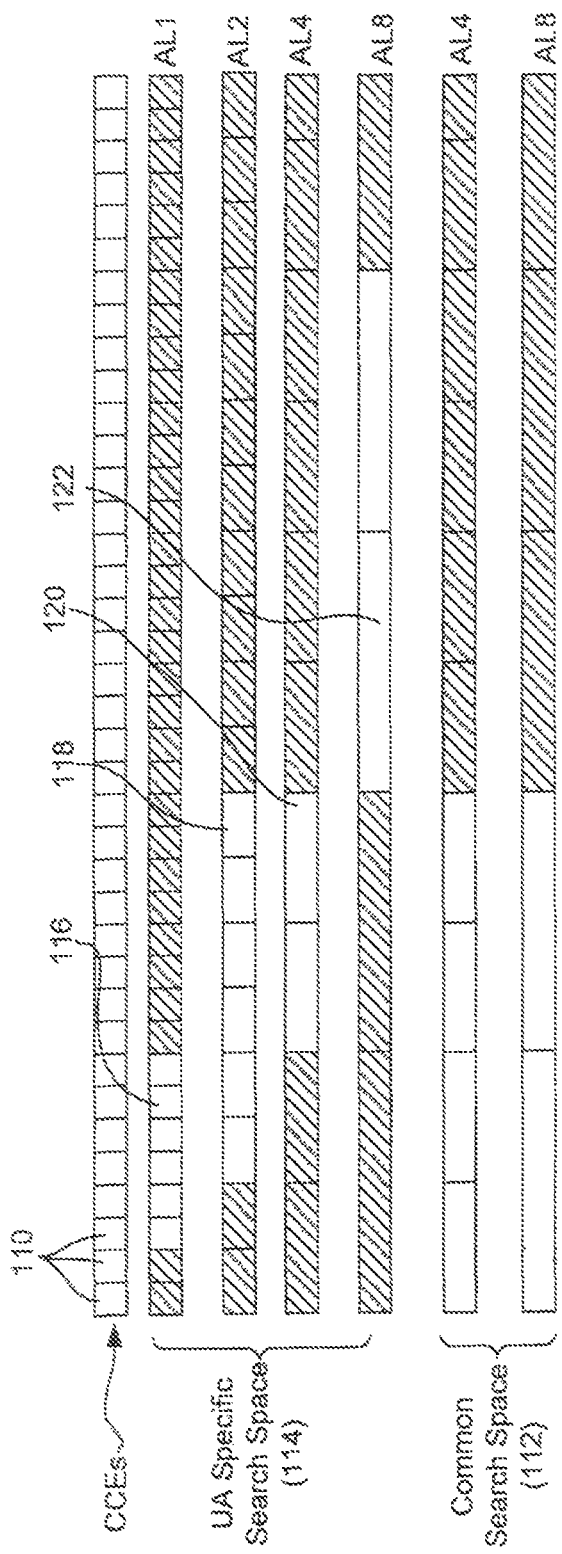
FIG. 3 is an illustration of aggregation levels and search spaces that may be present within the PDCCH region.

Referring to FIG. 3, an exemplary PDCCH region includes a plurality of control channel elements (CCEs) 110 that are used to transmit DCI formatted messages from access device 12 to UA 10. The UA 10 can search for CCEs that are used to transmit DCI messages within a UA specific search space 114 that is specific to a particular UA 10 and a common search space 112 that is common to all UAs linked to an access device 12. In the illustrated example, the PDCCH region includes thirty-eight CCEs, however other PDCCH instances may include more or fewer than 38 CCEs. Access device 12 selects one or an aggregation of CCEs to be used to transmit a DCI message to UA 10, the CCE subset selected to transmit a message depending at least in part on perceived communication conditions between the access device and the UA. For instance, where a high quality communication link is known to exist between an access device and a UA, the access device may transmit data to the UA via a single one of the CCEs (see 116) and, where the link is low quality, the access device may transmit data to the UA via a subset of two (see 118), four (see 120) or even eight CCEs (see 122), where the additional CCEs facilitate a more robust transmission of an associated DCI message. The access device may select CCE subsets for DCI message transmission based on many other criteria.

Hereinafter, unless indicated otherwise, CCE subsets that include one CCE will be referred to as "Aggregation level 1" or AL1 subsets. Similarly, subsets that include two CCEs will be referred to as "Aggregation level 2" or AL2 subsets, subsets that include four CCEs will be referred to as "Aggregation level 4" or AL4 subsets, and subsets that include eight CCEs will be referred to as "Aggregation level 8" or AL8 subsets. A higher aggregation level indicates that the number of CCEs used to transmit a particular DCI is larger (e.g., aggregation level 8 is higher than aggregation level 4) and is therefore more robust assuming a given set of channel conditions. Accordingly, UA's 10 with poor channel conditions may be assigned higher aggregation levels to ensure the UAs 10 can successfully decode DCI messages received on PDCCHs.

Referring now to FIG. 4, a table is provided that summarizes the information in FIG. 3 by showing aggregation levels for the UA-specific and common search spaces 114 and 112, respectively, as depicted in FIG. 3; the size of each aggregation level in number of CCEs; and the number of PDCCH (CCE subset) candidates to be searched by UA 10 at each aggregation level. In UA-specific search space 114, at aggregation level 1 the search space is 6 CCEs with a total of 6 PDCCH candidates. At aggregation level 2 the search space is 12 CCEs with a total of 6 PDCCH candidates. At aggregation level 4 the search space is 8 CCEs with 2 PDCCH candidates, and at aggregation level 8 the search space is 16 CCEs with 2 PDCCH candidates. In common search space 112, at aggregation level 4 the search space is 16 CCEs with 4 PDCCH candidates and at aggregation level 8 the search space is 16 CCEs with 2 PDCCH candidates.

Generally, by using different ones of the aggregation levels shown in FIG. 4, the reliability of a PDCCH transmission may be set for an intended UA. The set of PDCCH candidates to be monitored by a UA are defined in terms of search spaces, where a search space $S_k^{(L)}$ at aggregation levels 1, 2, 4, or 8 is defined by a set of PDCCH candidates. The CCEs corresponding to PDCCH candidate m of the search space $S_k^{(L)}$ may be given by the equation:

$$L \cdot \left\{ (Y_k + m) \bmod \left\lfloor \frac{N_{CCE,k}}{L} \right\rfloor \right\} + i \qquad \text{Eq (1)}$$

where $Y_k$ ($Y_k$ may be calculated as described in Section 9.1.1 of TS 36.213) is the random number to define a UA specific search space, L is the aggregation level, and i=0, ..., L−1 and m=0, ..., $M^{(L)}$−1. $M^{(L)}$ is the number of PDCCH candidates to monitor in a given search space.

Figure 5:
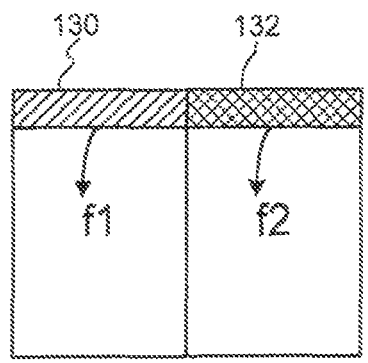
FIGS. 5a and 5b illustrate two exemplary PDCCH region design options for implementing a control-channel for two or more carriers for carrier aggregation.
Figure 5:
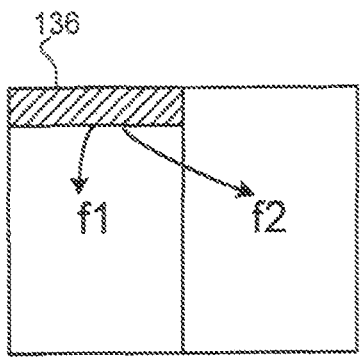

In the case of carrier aggregation, a control-channel structure is allocated to each carrier for distributing DCI control messages. FIGS. 5a and 5b illustrate two exemplary PDCCH design options for implementing a control-channel for two or more carriers for carrier aggregation. In FIG. 5a each carrier f1 and f2 is allocated a separate PDCCH region. Accordingly, DCI control messages relating to carrier f1 are distributed via PDCCH region 130 and DCI control messages relating to carrier f2 are distributed via PDCCH region 132. Although being relatively straightforward to implement, the PDCCH structure of FIG. 5a requires the allocation of substantial resources on each carrier and does not allow for cases when a particular carrier does not have a PDCCH region. If the PDCCH region for multiple carriers is reserved on a single carrier, then the other carrier will be configured to transmit only PDSCH without the control region, which will increase the bandwidth efficiency of the PDSCH transmission. In addition, the coverage of each carrier may be different. Also, in some cases, it may be desirable to transmit control on a single carrier in order to simplify UA implementation. Accordingly, in many cases, a particular carrier may not implement or make available a PDCCH region.

FIG. 5b illustrates an alternative PDCCH region design option, where one PDCCH region may be configured to distribute DCI control messages for the carrier on which the PDCCH is transmitted, in addition to zero or more other carriers. In FIG. 5b, DCI control messages relating to carrier f1 are distributed via PDCCH region 136. In addition, PDCCH region 136 on carrier f1 may be configured to distribute DCI control messages relating to carrier f2 and/or additional carriers (not illustrated). Although it may be possible to implement the PDCCH design option illustrated in FIG. 5b using a new DCI field that indicates the PDSCH/PUSCH carrier to which the DCI control message relates, such a solution is not desirable as it would modify or increase the number of existing DCI formats.

The present system facilitates the sharing of a single control channel such as a Physical Downlink Control CHannel (PDCCH) region amongst two or more carriers that allows DCI control messages distributed via one PDCCH region on a first carrier to determine resource allocations on each of the two or more carriers. Depending upon the network configuration, the present system may be implemented using a conventional DCI control message format. As such, the lengths of the existing DCI formats, even after implementation of the present system, may remain unchanged. While each solution is described separately below, it should be appreciated that various aspects of the different solutions may be combined in at least some embodiments to result in other useful solutions.

Solution 1

In one implementation of the present system, the CCEs on a single carrier PDCCH region are assigned to different groups, wherein each group is pre-assigned to different carriers of a multi-carrier system. For example, with reference to FIG. 6, PDCCH region 140 is located on carrier f1. The CCEs of PDCCH region 140 are allocated into two groups, with each group being assigned to either carrier f1 or carrier f2. PDCCH region 140 includes a first CCE group 142 of PDCCH 140 wherein the CCE group 142 is allocated to carrier f1. The first CCE group 142 includes CCEs 0-17 of PDCCH region 140. Similarly, a second CCE group 144 of PDCCH region 140 is allocated to carrier f2 and includes CCEs 18-35 of PDCCH region 140. In systems having three or more carriers, the CCEs on a single PDCCH region may be allocated into a number of groups equal to the number of carriers. Depending upon the network implementation, the number of CCEs allocated to each group may be equal, or varying between the carriers.

Figure 6:
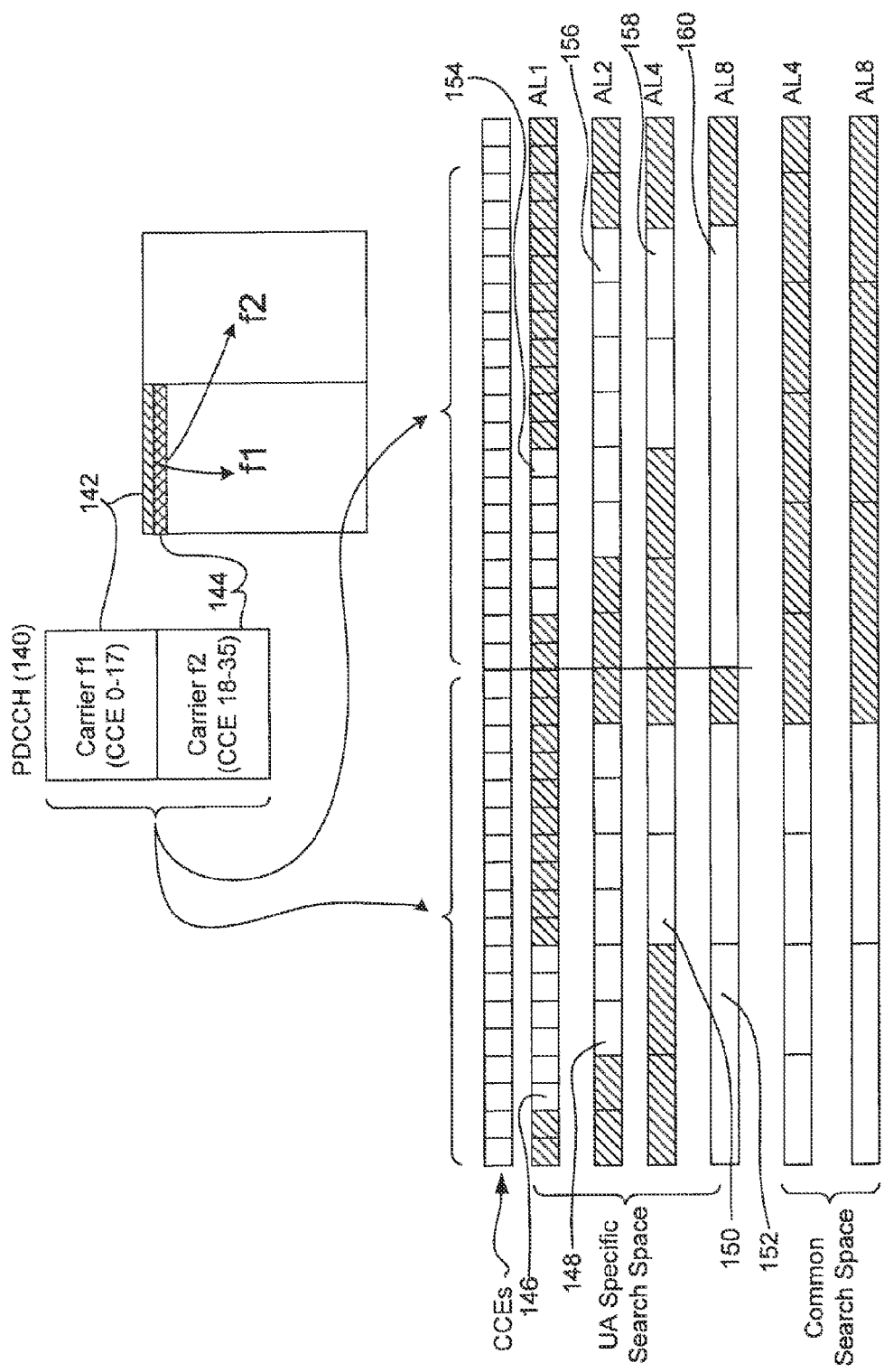
FIG. 6 illustrates an exemplary PDCCH region having sets of CCEs, wherein each set of CCEs is assigned to a different carrier and also shows exemplary aggregation levels and search space for allocating DCI control messages between carriers f1 and f2.

Referring still to FIG. 6, aggregation levels and search spaces that may be present within PDCCH region 140 for allocating DCI control messages between carriers f1 and f2 are shown. PDCCH region 140 includes 36 CCEs. CCEs 0-17 are placed into a first group and allocated to carrier f1 (the carrier containing PDCCH region 140) and CCEs 18-35 are placed into a second group and allocated to carrier f2. Using PDCCH region 140, access device 12 selects one or an aggregation or subset of CCEs to transmit a DCI control message to UA 10. The particular CCE subset selected by the access device may depend, at least in part on perceived communication conditions between the access device 12 and the UA 10. The CCE subset selected also determines the carrier on which the DCI control message allocates resources.

For example, where a high-quality communication link is known to exist between an access device 12 and a UA 10 on carrier f1, the access device 12 may transmit control messages to the UA 10 via a single one of the CCEs (see 146) within the group of CCEs 142 allocated to carrier f1. Where the carrier f1 link is low-quality, the access device 12 may transmit data to the UA 10 via a subset of two (see 148), four (see 150) or even eight CCEs (see 152) within the group of CCEs 142 allocated to carrier f1, where the additional CCEs facilitate a more robust transmission of an associated DCI message to the UA 10.

Similarly, where a high-quality communication link is known to exist between an access device and a UA on carrier f1, the access device may transmit data to the UA 10 via a single one of the CCEs (see 154) within the group of CCEs 144 allocated to carrier f2. Since the PDCCH region for carrier f2 is transmitted on carrier f1, the channel quality on carrier f1 should be considered in determining the aggregation level. Where the carrier f1 link is low quality, the access device may transmit data to the UA 10 via a subset of two (see 156), four (see 158) or even eight CCEs (see 160) within the group of CCEs 144 allocated to carrier f2, where the additional CCEs facilitate a more robust transmission of an associated DCI message. The access device may select CCE subsets for DCI message transmission based on many other criteria.

If a UA 10 finds a valid DCI control message format in CCE space 142 designated for carrier f1, the UA 10 may conclude that the corresponding grant is valid for carrier f1. Conversely, if a UA 10 finds a valid DCI format in CCE space 144 designated for carrier f2, the UA 10 may conclude that the corresponding grant is valid for carrier f2.

In many cases, the total number of CCEs made available on PDCCH region 140 may be more or less than 36 depending upon system requirements. For example, a high number of CCEs within the PDCCH region may minimize occurrences of blocking on the PDCCH, where the access device wishes to transmit to a particular UA during a given subframe, but the access device cannot find a suitable subset of CCEs within the PDCCH region in which to place the desired DCI control message. Furthermore, it is not necessary that the CCEs be evenly distributed between carriers. For example, a carrier that is known to have a particular strong or high-quality connection between an access device and scheduled UAs may be allocated less total CCEs within the PDCCH region, as it is unlikely that higher levels of aggregation will be necessary for the carrier. Conversely, carriers with very low-quality connections may be allocated a higher total number of CCEs within the PDCCH region, as they will more often require high levels of aggregation.

In one implementation, CCE set 142 allocated to carrier f1 is signaled using Rel-8 signaling Physical Control Format Indicator Channel (PCFICH) and CCE set 144 allocated to carrier f2 is signaled using an alternative signaling method. In that case, Rel-8 UAs may not be served by CCE set 144.

In another implementation, the entire CCE space (including CCE sets 142 and 144) is signaled using Rel-8 signaling to Rel-8 UAs using the PCFICH, and CCE sets 142 and 144 are signaled as two entities to Rel-10 UAs using Rel-10 signaling. For example, RRC signaling can be used to indicate CCE sets 142 and 144. In that case, Rel-8 UAs may span the entire PDCCH space for a single grant, while a single grant for Rel-10 UAs is located in either CCE set 142 or CCE set 144. In both cases, the solution may be transparent to Rel-8 UAs, because the UAs use the same PDCCH search procedure as currently defined, and the access device may ensure that a particular grant is located in the proper place for each UA.

In some cases, it may be difficult to define a sufficiently large PDCCH space using Rel-8 techniques to accommodate multiple carrier operation. For example, if more than 3 Orthogonal Frequency Division Multiplex (OFDM) symbols are needed for the PDCCH, it may be difficult to offset the traffic channel (PDSCH) from the control channel (PDCCH). As such, the system or a portion of the system may be implemented in the logical domain, where CCE set 142 is defined as in Rel-8 and CCE set 144 uses a particular set of radio resources, for example, a set of physical resource blocks. This, however, may require that the UA buffer the entire subframe and may therefore eliminate the micro-sleep advantage of the existing PDCCH structure.

The first solution described above may not allow trunking between PDCCH region 140 CCE subsets 142 and 144 for carrier f1 and carrier f2, and therefore may result in a higher blocking rate compared to a completely common PDCCH space. Therefore, it may be desirable to use a common set of CCEs to make allocations on both carriers f1 and f2 without changing the Rel-8 DCI formats. In addition, it may be difficult to reserve the search space for each carrier, especially at larger aggregation levels.

Signaling may be implemented to instruct each UA 10 how to map a set of CCEs to a particular carrier. In some cases, broadcast signaling may be used to divide the PDCCH region into CCE groups. For example, referring again to FIG. 6, broadcast signaling may be used to indicate that CCE set 142 corresponds to CCEs 0-17 and CCE set 144 corresponds to CCEs 18-35.

After the CCE sets are configured, the access device may indicate which carriers correspond to which CCE set. Additionally, the access device may indicate a carrier index within each CCE set. For example, where CCE set 142 is referred to as CCE set "0" and is used for three carriers (not as in FIG. 6) and CCE set 144 is referred to as CCE set "1" and is used for one carrier, example signaling is illustrated in the following table:

TABLE 1

| Carrier Index | CCE Set | Carrier Index Within CCE |
| --- | --- | --- |
| 0 | 0 | 0 |
| 1 | 0 | 1 |
| 2 | 0 | 2 |
| 3 | 1 | 0 |

In this case, the DCI messages may be modified to indicate the carrier index within the CCE set, or one of the solutions described below can be used to indicate the carrier.

If there is only one defined CCE set, as in FIG. 6, the carrier index within the CCE set may be equal to the carrier index, in which case signaling may not be necessary.

Solution 2

Figure 7:
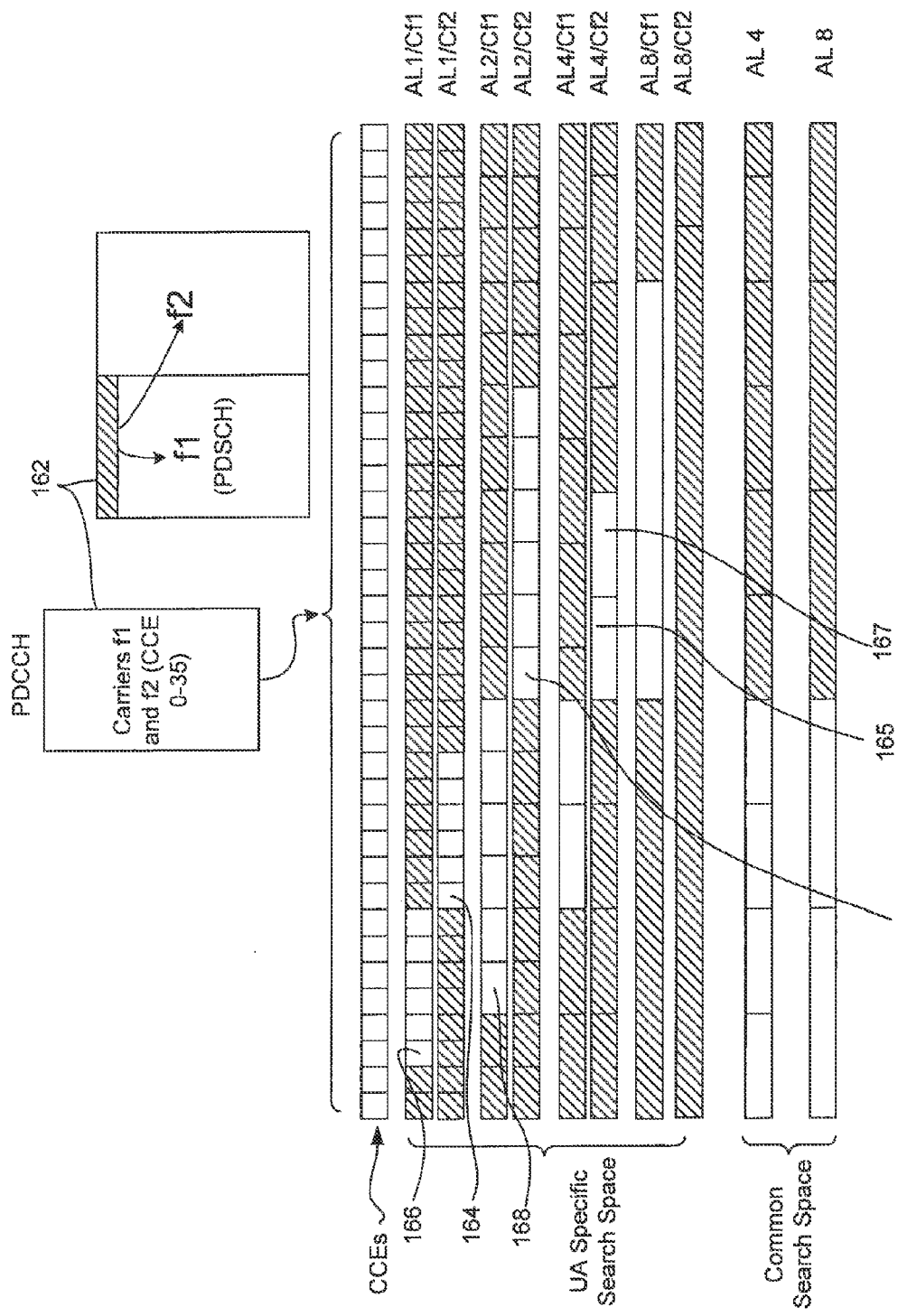
FIG. 7 illustrates an exemplary PDCCH region having CCEs allocated to two carriers, wherein the CCEs allocated to each carrier may be distributed through the PDCCH region and also shows exemplary aggregation levels and search spaces that may be present within the PDCCH region for allocating DCI control messages between carriers f1 and f2.

In other implementations, CCEs can be shared among multiple component carriers, provided that a first PDCCH DCI control message candidate for a first carrier at a particular aggregation level does not overlap with a second PDCCH DCI control message candidate for a second carrier at the same aggregation level. Referring to FIG. 7, carriers f1 and f2 each may be allocated resources by any of the CCEs (in this example, a total of 36 CCEs numbered 0-35) available on the carrier f1 PDCCH region 162. To differentiate CCE allocations for carrier f1 and carrier f2, PDCCH 162 candidates for each non-anchor carrier at an aggregation level are shifted by a number of CCEs allocated on the anchor carrier relative to the position of each PDCCH candidate on the anchor carrier.

In FIG. 7, aggregation levels and search spaces that may be present within PDCCH region 162 for allocating DCI control messages between carriers f1 and f2 are illustrated, where the DCI control messages for carriers f1 and f2 may be distributed throughout PDCCH region 162. In FIG. 7, DCI control messages for carriers f1 and f2 each may be allocated one or more of CCEs numbered 0-35 (i.e., any of the CCEs available on PDCCH region 162). To differentiate allocations for carrier f1 and carrier f2, the PDCCH candidates for carrier f2 are shifted relative to the position of the CCEs allocated to the anchor carrier (e.g., carrier f1).

For example, in FIG. 7, the PDCCH candidates for aggregation level 1 for carrier f2 are shifted relative to the PDCCH candidates for carrier f1 by the number of CCEs allocated to the anchor carrier at aggregation level 1. In FIG. 7, six CCEs starting with PDCCH candidate 166 have been allocated to the anchor carrier (carrier f1). The starting CCE 164 for the carrier f2 PDCCH candidates, therefore, is shifted from the same starting position as those on the anchor carrier by the number of CCEs allocated to the anchor carrier—in this case 6. As such, the starting point for PDCCH candidate 164 is shifted 6 CCEs to the right.

Similarly, referring still to FIG. 7, there are six PDCCH or CCE subset candidates for AL2 and carrier f1 (Cf1) that start with candidate 168. Because there are six PDCCH candidates on AL2, the first 170 of six PDCCH candidates for carrier f2 (Cf2) on AL2 is shifted by six candidates as shown.

A similar process may be repeated to specify and issue PDCCH candidates allocated amongst the carriers at each aggregation level. The algorithm may also be applied as additional carriers are added to the system. PDCCH candidates for a third carrier, for example, would be shifted to the right by the number of PDCCH candidates allocated to both carriers f1 and f2. Similarly, PDCCH candidates for a fourth carrier would be shifted to the right by the number of PDCCH candidates allocated to carriers f1, f2, and f3.

If UA 10 finds a valid DCI control message format at a particular aggregation level, the UA 10 can determine to which carrier the grant is allocated based upon the CCEs used to transmit the DCI message. If the CCEs used to transmit the DCI message are within those allocated to a first carrier, the grant is for resources on the first carrier. If, however, the CCEs are included within the set allocated to a second carrier, the grant is for resources on the second carrier, and so on.

In FIG. 7, for aggregation level 4 and aggregation level 8, only a single carrier (e.g., the anchor carrier) may overlap with the common search space. As such, special handling of the AL4 and AL8 regions of PDCCH 162 is required. In the example shown in FIG. 7, while two candidates 165 and 167 exist for carrier f2 at AL4, there are zero candidates for f2 at AL8 because the remaining candidates are used for either the UA 10 specific search space or the common search space on carrier f1.

In another implementation, the UA 10 may retrieve all DCI control messages distributed at a first aggregation level and determine the carrier associated with each control message based upon the total number of DCI control messages at that aggregation level, assuming the control messages are evenly distributed amongst the carriers. For example, if there are 6 total DCI control messages distributed at aggregation level 1, and UA 10 knows there are two carriers being served by the PDCCH, the UA 10 may determine that the first three control messages allocate resources on carrier f1 and the second three control messages allocate resources on carrier f2. In other words, the system may be configured to evenly distribute the PDCCH candidates amongst the carriers and also to issue the candidates in the same order as that of the carriers. In the case of three carriers (not shown), for example, the first third of the control messages would allocate resources on carrier f1, the second third on carrier f2, and the final third on carrier f3. This process may be repeated at all aggregation levels for any number of carriers.

In some cases, it may be difficult to define a sufficiently large PDCCH space using Rel-8 techniques to accommodate multiple carrier operation. Because a common search space may be shared between Rel-8 and Rel-10 UEs, the search space may be signaled using Rel-8 signaling, such as the PCFICH. As a result, the search space may be limited to a total of 3 OFDM symbols (or 4 OFDM symbols for a carrier bandwidth of 1.4 MHz, although such a narrow bandwidth is unlikely to be applied for carrier aggregation).

In FIG. 7, the PDCCH candidates for carrier f2 are located next to the PDCCH candidates for carrier f1. This is one positioning algorithm, and it should be understood that any positioning algorithm can be used. For example, the PDCCH candidates for carrier f2 may be located pseudo-randomly within the PDCCH, similar to the process used for the PDCCH candidates for carrier f1. In case a PDCCH candidate for carrier f1 overlaps with a PDCCH candidate for carrier f2, one carrier must be given priority. For example, in case of overlap, the PDCCH candidates can be known at the UA 10 and access device 12 to correspond to carrier f1.

Solution 3

Figure 8:
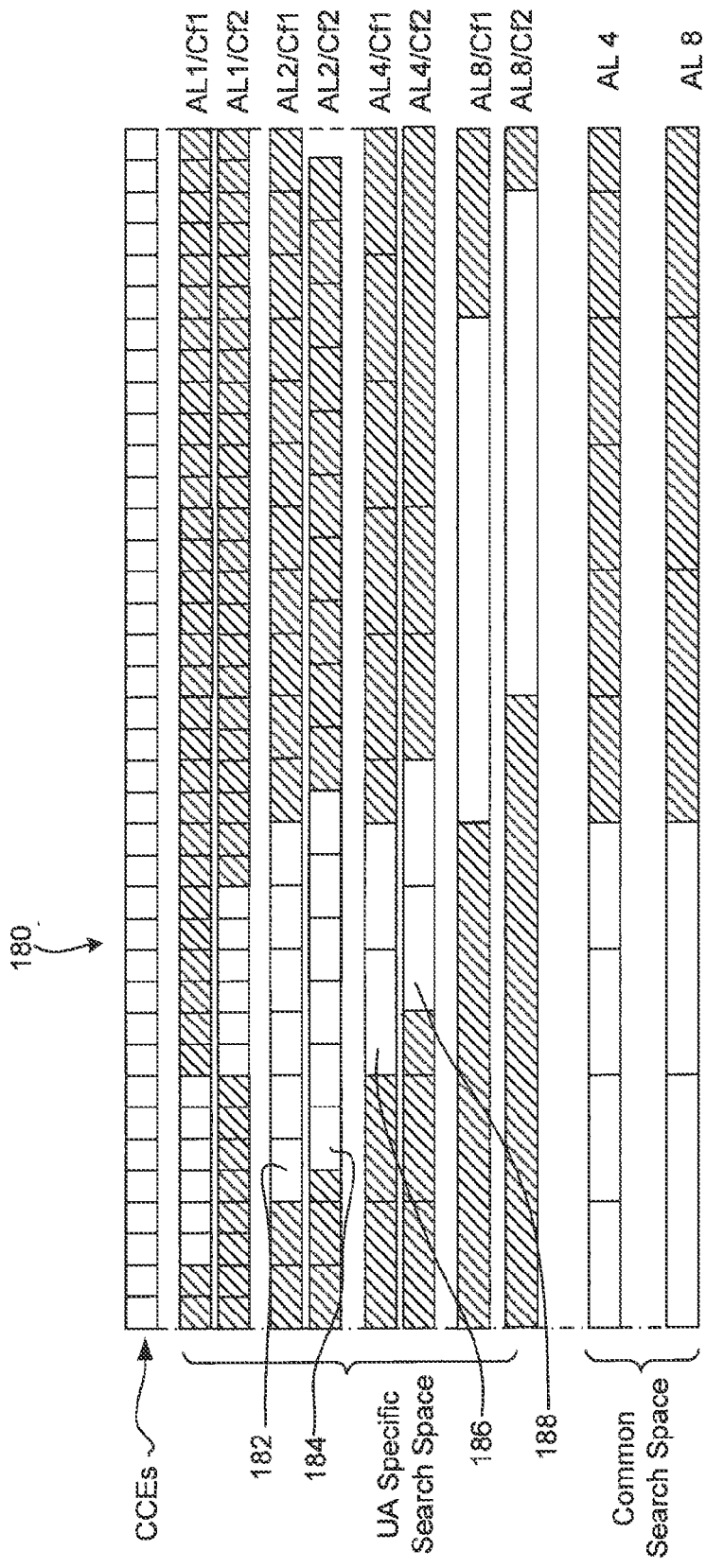
FIG. 8 is an illustration of aggregation levels and search spaces that may be present within a PDCCH region wherein, for each aggregation level, the PDCCH candidates for a particular carrier may be shifted by a multiple of the number of CCEs in the next smaller aggregation level.

In another implementation, for a particular aggregation level, the starting CCE for PDCCH candidates allocated for each carrier at each aggregation level is shifted based upon the number of CCEs in the next smaller aggregation level. FIG. 8 illustrates PDCCH 180 wherein, for each aggregation level, the PDCCH candidates for a particular carrier may be shifted by a multiple of the number of CCEs in the next smaller aggregation level. For example, at one aggregation level and for two carriers, the DCI control messages for the second carrier may be offset from the control messages for the first carrier by a number of CCEs equal to the number of CCEs that are aggregated into each PDCCH candidate at the next lower aggregation level. Note that the offset for aggregation level 1 is a unique case, as there is no aggregation level lower than 1. In that case, the offset for aggregation level may be set to any integer (e.g., an offset of 6 is illustrated in FIG. 8).

Referring still to FIG. 8 for a specific example, the starting CCE for the aggregation level 2 PDCCH candidate 184 for carrier f2 is shifted by one CCE (equal to the number of aggregated CCEs in the next smaller aggregation level) relative to the PDCCH candidate 182 for carrier f1. Similarly, the PDCCH candidates 188 for aggregation level 4 for carrier f2 is shifted by two CCEs (equal to the number of aggregated CCEs in the next smaller aggregation level) relative to the PDCCH candidates 186 for carrier f1, and so on.

By shifting PDCCH candidates for different frequencies at any given aggregation level by the number of CCEs in each PDCCH candidate at a lower aggregation level, the PDCCHs at the different frequencies at each aggregation level will not precisely overlap and, therefore, the CCE subset candidates are unique.

Here, it should be appreciated that this third solution may be generalized such that any offset which is less than the number Q of CCEs that make up a PDCCH candidate at the same aggregation level may be used. More broadly, the primary restriction on the offset is that it is not an integer multiple of Q. For instance, at aggregation level AL4 in FIG. 8, the offset shown is equal to two CCEs. That offset may be changed to one CCE or three CCEs (i.e., Q−1) to achieve a similar affect. Similarly, the four CCE offset shown in FIG. 8 for AL8 may be anywhere from one CCE to seven CCEs (i.e., again Q−1 where Q is the number of CCEs in each AL8 CCE subset candidate).

More broadly, the primary restriction on the offset shift may be that it is not an integer multiple of the number of CCEs that make up a PDCCH candidate at the same aggregation level in at least some embodiments.

Solution 4

Figure 9:
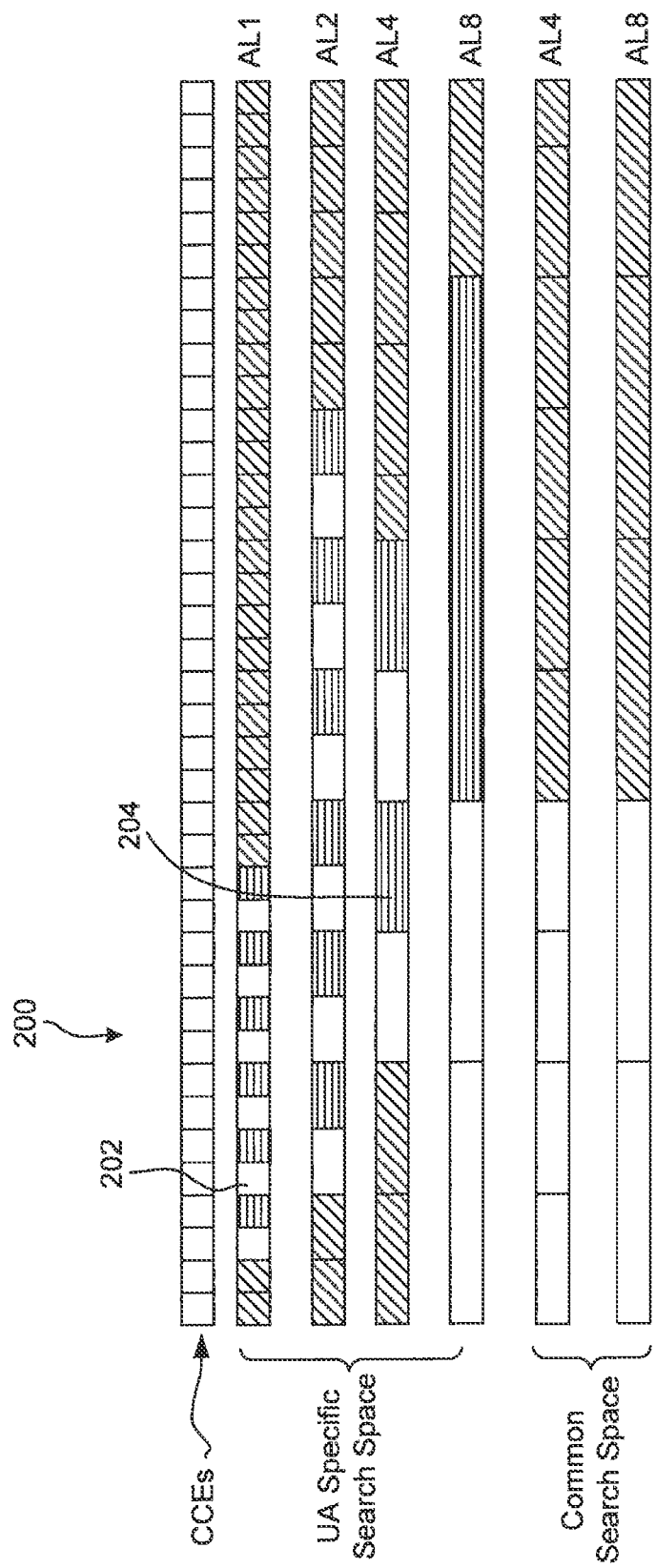
FIG. 9 is an illustration of aggregation levels and search spaces that may be present within a PDCCH region wherein the carrier index for a particular PDCCH candidate may be calculated by a CCE index of the PDCCH candidate.

Referring to FIG. 9, in yet one other embodiment, the carrier for a particular PDCCH candidate may be calculated by the CCE index of the PDCCH candidate. For example, assuming the number of configured carriers is N, the carrier index for a particular PDCCH candidate may be determined by the following equation:

$$\text{Carrier Index} = (I_{cce}/L) \text{MOD } N + 1 \qquad \text{Eq (2)}$$

where $I_{cce}$ is the index of the first CCE in a specific PDCCH candidate and L is the currently considered aggregation level. In FIG. 9, for example 200, the carrier index for PDCCH candidate 202 may be determined using Eq (2). PDCCH candidate 202 has an $I_{cce}$ of 4, an aggregation level of 1. PDCCH includes 2 carriers, so the carrier for PDCCH candidate 202 is equal to (4/1) MOD 2+1=4 MOD 2+1=0+1=1.

Similarly, PDCCH candidate 204 has an $I_{cce}$ of 12, and an aggregation level of 4. Accordingly, the carrier for PDCCH candidate 204 is equal to (12/4) MOD 2+1=3 MOD 2+1=1+1=2. In this manner, the carrier assigned to each PDCCH candidate in FIG. 9 may be calculated by the UA 10. As such, in some implementations, the present system interdigitates PDCCH candidates for each carrier at a particular aggregation level.

To guarantee that a UA 10 achieves an unique carrier index with equation (2), it is necessary to increase the number of PDCCH candidates as a function of the number of configured carriers as shown in FIG. 10. In FIG. 10 a table is provided that shows aggregation levels for UA-specific space and the minimum required size of the search space for each aggregation level in number of CCEs. At aggregation level 1, the minimum search space is N CCEs, where N is the number of carriers. At aggregation level 2, the minimum search space is 2*N CCEs. At aggregation level 4, the minimum search space is 4*N CCEs, and at aggregation level 8, the minimum search space is 8*N CCEs. That is, the minimum search space size could be specified as AL*N CCEs, where AL is the aggregation level (1, 2, 4, or 8) and N is the number of carriers.

In other embodiments, in the case of carrier aggregation, where an access device communicates with several UAs, blocking may occur where all of the PDCCH candidates associated with one of the UAs (at one or more of the aggregation levels) are currently being used and a delay occurs in transmitting a grant to one or more of the UAs. For this reason, it has been recognized that in the case of carrier aggregation, in at least some cases it will be useful to be able to increase the size of the CCE search space and the number of PDCCH candidates in cases where a UA is capable of blind decoding an increased number of candidates. For instance, in some cases, it may be useful to increase the CCE search space size and number of PDCCH candidates as a function of the number of configured carriers. One exemplary way to increase the search space size and number of PDCCH candidates as a function of the number of configured carriers is illustrated in FIG. 17 where, for instance, max(N,6) means the maximum of the number of carriers and 6 is selected as the size of the search space in CCEs for aggregation level 1. Similarly, 2×max(N,6) means the maximum of two times the number of carriers, and 12, and so on. Thus, for instance, where the number of configured carriers is 4, the search space in CCEs is 32 (e.g., 8×max(N,2) where N is 4) and the number of PDCCH candidates is 4 (e.g., max(N,2) where N is 4) so that there will be four candidates where each candidate includes 8 CCEs.

In order to receive the downlink DCI and the uplink DCI simultaneously, the number of PDCCH candidates can be increased by two times the number of configured carriers as shown in FIG. 18.

In another embodiment, a larger number of PDCCH candidates can be used instead of the number of PDCCH candidates used in the LTE Rel-8 system when carrier aggregation is configured, regardless of number of actual configured carriers. FIG. 19 shows one exemplary approach where M1, M2, M3 and M4 represent the number of PDCCH candidates for aggregation levels 1, 2, 4, and 8, respectively, and where M1, M2, M3 and M4 should be greater than or equal to the number of PDCCH candidates used in LTE Rel-8, respectively. These values can be signaled or predefined in the specification. In at least some embodiments, the same value can be used for M1, M2, M3 and M4 or different values can be used. In FIG. 19, note that where only a single carrier is configured, the search space size and number of PDCCH candidates are identical to the space size and candidate numbers in the Rel 8 system. Thus, here again, the number of configured carriers affects the search space size and the number of PDCCH candidates.

FIGS. 10, 17, 18 and 19 show several different ways to extend the UA specific search space, but the techniques can also apply to the common search space if the PDCCH transmitted in the common search space is transmitted on a different carrier than the carrier on which PDSCH/PUSCH are transmitted.

The number of carriers for PDSCH transmission, and the number of carriers for PUSCH transmission can be different, depending on the eNB configuration. In this case, N can be the larger number of carriers.

In another embodiment, referring to FIG. 20, a first set of PDCCH candidate sizes (A1, A2, A3, and A4) may be used for single carrier operation (N=1) and a second set of PDCCH candidate sizes (C1, C2, C3, and C4) may be used for carrier aggregation, wherein the second set of PDCCH candidate sizes (C1, C2, C3, C4) is defined using a function which includes the first set of PDCCH candidate sizes (A1, A2, A3, A4) and a scaling parameter (B1, B2, B3, and B4) multiplied by the number of carriers (N) minus 1. In at least some embodiments, the first set of PDCCH candidate sizes (i.e., A1, A2, A3, A4) equals those used in LTE Rel-8.

This scheme may be further generalized so that a single set of PDCCH candidates may be dedicated to a particular set of carriers in a non-uniform manner. For example, for two carriers, one carrier may be allocated 6 PDCCH candidates and the other carrier may be allocated 3 PDCCH candidates. Alternatively, equations may be employed so that the locations of the PDCCH candidates for a particular aggregation level are random for each carrier. This may be implemented, for example, by adding a carrier index field to the equations found in 3GPP TS 36.213, v8.6.0, March 2009.

In some cases, depending on the size of the PDCCH, it may be possible for PDCCH candidates for more than one carrier to collide. In that case, the PDCCH candidate may be allocated to a particular carrier, for example the carrier with the lowest carrier index (e.g. the anchor carrier).

In some cases, the search space size and number of PDCCH candidates increase with the number of carriers up to a certain number of carriers and then maintain a constant value as more carriers are added. For example, for 1, 2, 3, 4, 5 carriers, respectively, considering N=1, the number of PDCCH candidates could be 6, 10, 14, 18, 18. In this case, no additional PDCCH candidates are used in the transition between 4 and 5 carriers.

The above embodiments of the present system may be implemented separately or in combination.

Solution 5

In some implementations of the present system, the anchor carrier's C-RNTI or the RNTI of each UA may be used to determine the allocation of PDCCH candidates amongst carriers in the UE-specific search space. In the following examples, the search space may be the same size or expanded relative to Rel-8.

Multiple RNTIs may be assigned to a UA with one RNTI being assigned for each carrier. For example, for a system using two carriers, a UA 10 may be assigned a first RNTI associated with a first carrier and a second RNTI associated with a second carrier. If the access device wishes to allocate resources on the second carrier to the first UA, the access device uses the second RNTI of the UA when encoding the DCI control message. Similarly, if the access device 12 wishes to allocate resources on the first carrier to the UA 10, the access device 12 uses the first RNTI of the UA when encoding the DCI control message. As such, the UA can determine which carrier the control message allocates services on by attempting to decode the message using both RNTIs. The number of the RNTI that successfully decodes the control message tells the UA the carrier on which the control message allocates resources.

For example, after receiving a PDCCH candidate, each UA may attempt blind decoding of the candidate. After blind decoding, the CRC scrambling of the PDCCH candidate is compared against all of the UA's assigned RNTI values. If one of the RNTI can be used to successfully descramble the PDCCH candidate, the RNTI used to perform the descrambling identifies the particular carrier associated with the DCI control message of the PDCCH candidate. Alternatively, different CRC masks may be used for each carrier to achieve a similar functionality.

In another implementation, the modulation symbols or Resource Element Groups (REGs) within a PDCCH candidate may be rotated (or otherwise have their order varied) as an indication of which carrier the PDCCH candidate allocates resources. For example, after generating the Log Likelihood Ratios (LLRs) for a particular PDCCH candidate, a UA 10 attempts to blind decode the PDCCH candidate using the standard approach (and standard configuration of the REGs).

If the decoding is successful, the PDCCH candidate is allocated to carrier f1. If the decoding fails, the UA 10 is configured to shuffle the LLRs (corresponding to the modulation symbols) of the REGs into an alternate order accordingly to a pre-determined algorithm and attempt blind decoding again. If the blind decoding using the first alternate ordering works, the PDCCH candidate is allocated to carrier f2. The shuffling algorithm may be implemented a second, third or fourth time, for example, to identify third, fourth and fifth carriers. In this example, the standard order and any pre-defined alternate orderings for the LLR correspond to different carriers. In some cases, two or more different ordering configurations may be defined for the REGs, allowing the REG ordering to indicate allocation of a PDCCH candidate to one of two or more carriers.

Figure 11:
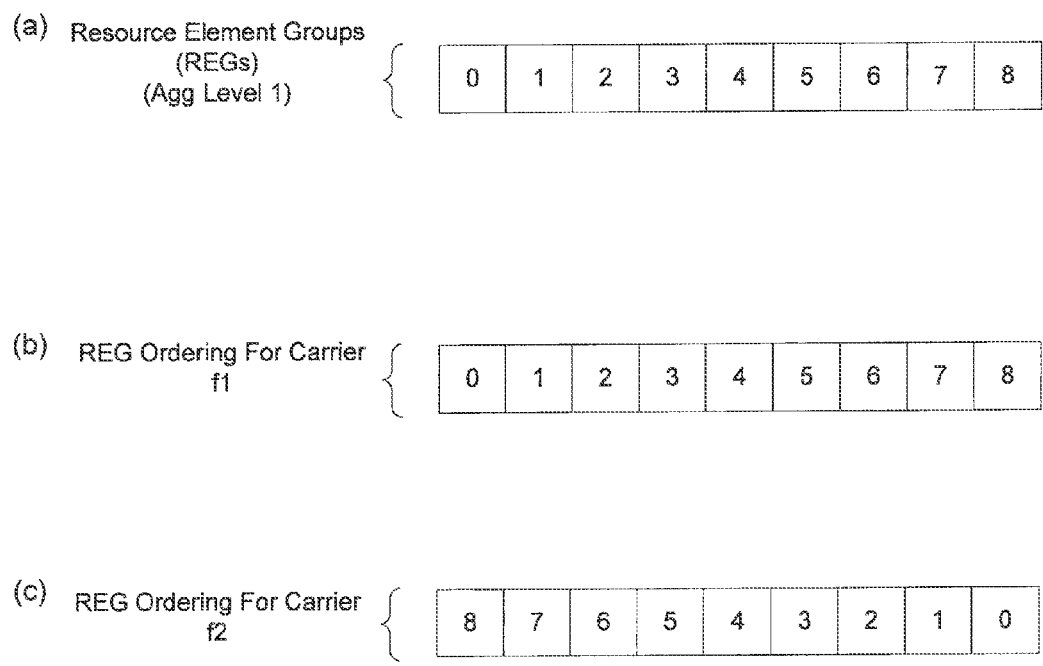
FIGS. 11a-11b illustrate Resource Element Group (REG) reordering, wherein the REG reordering may be used to distinguish amongst carriers potentially associated with a PDCCH candidate.

As an example, FIGS. 11a-11c illustrate REG reordering, wherein the REG ordering may be used to distinguish amongst carriers associated with a PDCCH candidate. FIG. 11a illustrates REGs that may be defined for aggregation level 1. FIG. 11b illustrates an example order of the REGs of FIG. 11a for identifying carrier f1. FIG. 11c illustrates an example order of the REGs of FIG. 11a for identifying carrier f2. At aggregation level 1, nine REGs (as shown in FIG. 11a) may be used to construct one CCE which may then be blind decoded to determine whether a valid DCI control message is present. A first REG ordering is used for carrier f1. If blind decoding of the PDCCH candidate is successful using the ordering of FIG. 11b, the UA 10 determines that the PDCCH candidate is allocated to carrier f1. However, if blind decoding fails, the REGs may be reordered in accordance with FIG. 11c and a second blind decoding may be attempted by the UA. If the blind decoding is successful, UA 10 determines that the PDCCH candidate is allocated to carrier f2. If, however, that blind decoding is also unsuccessful, UA 10 may determine that the PDCCH candidate is invalid (e.g., allocated to another UA), or is allocated to another carrier.

In FIGS. 11b and 11c, a reversal of the individual REGs is shown to distinguish PDCCH candidates allocated to carrier f2 from those allocated to carrier f1. In other implementations, however, other reordering algorithms may be implemented. In one example, the individual resource elements or modulation symbols within each REG are reordered to implicitly signal a different carrier. For example, the position of a specific number or combination of numbers within the REG may indicate the carrier.

Figure 12:
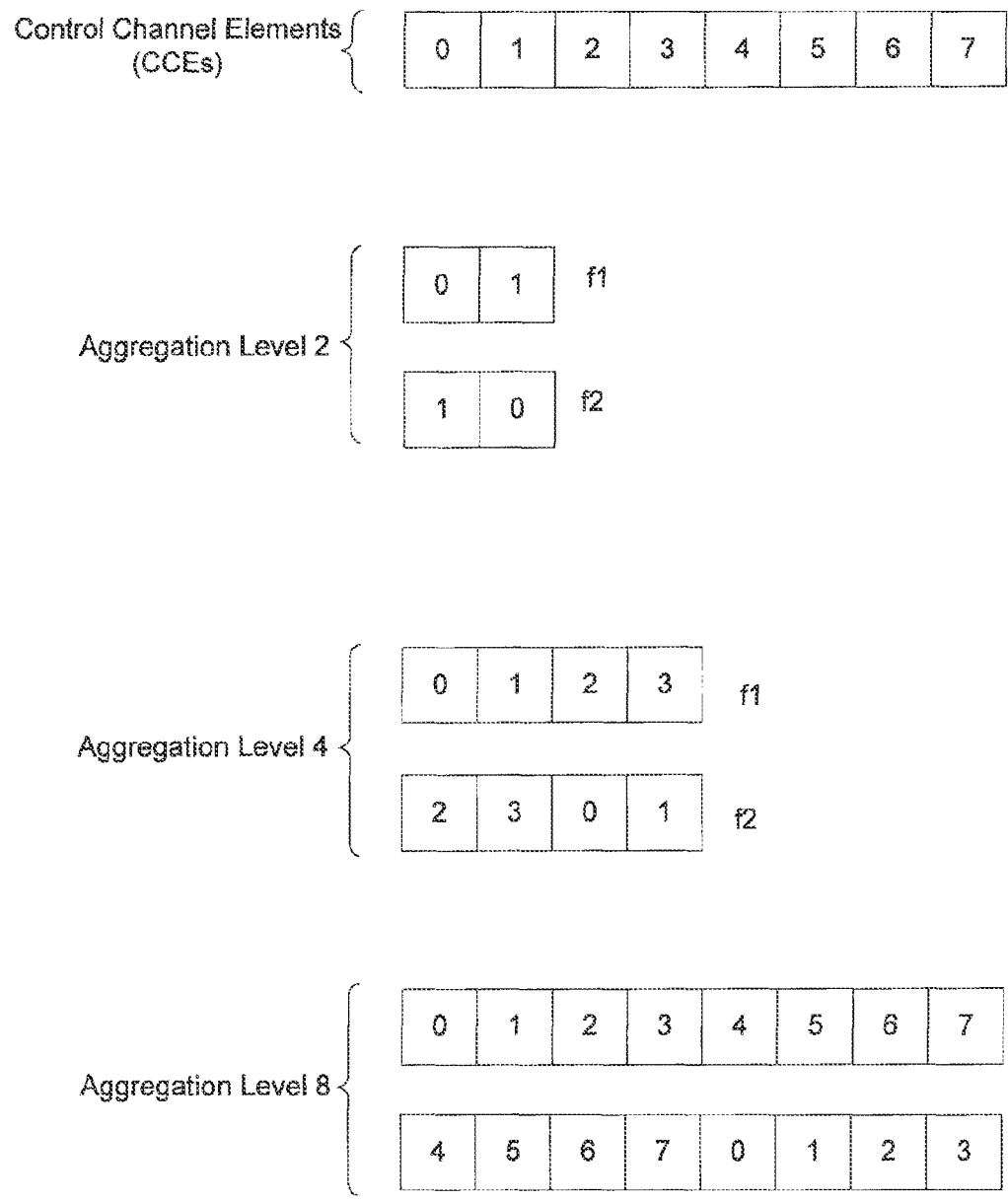
FIG. 12 is an illustration showing example constructions of PDCCH candidates for each of carriers f1 and f2 at aggregation levels 2, 4, and 8, wherein, for aggregation levels higher than aggregation level 1, the ordering of the CCEs that make up each potential PDCCH candidate is varied.

Alternatively, for aggregation levels higher than aggregation level 1, the ordering of the CCEs that make up a potential PDCCH candidate could be varied with their ordering indicating the carrier to which the PDCCH candidate is allocated. An example of such an approach is shown in FIG. 12. FIG. 12 shows an example construction of PDCCH candidates for each of carriers f1 and f2 at aggregation levels 2, 4, and 8.

For each potential PDCCH candidate, blind decoding on the aggregated CCEs in the currently specified ordering (e.g., according to the LTE specification) is first attempted. If the blind decoding is successful, it may indicate that the PDCCH candidate is allocated to carrier f1. If blind decoding fails, then the CCEs are reordered (FIG. 12 illustrates a rotation of the CCEs by half the amount of the current aggregation level, but other CCE reorderings may also be possible) and a second blind decoding is performed. If this blind decoding is successful, it may indicate that the PDCCH candidate is allocated to carrier f2. This approach would not work for aggregation level ALL because this approach requires multiple CCEs being used to construct a PDCCH candidate.

Thus, in FIG. 12, at AL2 and carrier f1, CCEs 0 and 1 are processed in the conventional order 0 followed by 1. If decoding is successful, the DCI message corresponds to carrier f1. The UA 10 also attempts to decode the CCEs in the reverse order 1 followed by 0, where successful decoding results in a DCI message corresponding to carrier f2. The UA 10 also attempts to decode CCEs 0, 1, 2 and 3 in the conventional order for carrier f1 and in the order 2, 3, 0, 1 for carrier f2 at level AL4 and CCEs 0, 1, 2, 3, 4, 5, 6 and 7 in the conventional order for carrier f1 and in the order 4, 5, 6, 7, 0, 1, 2, and 3 for carrier f2 at level AL8.

Finally, a reserved bit may be used in an existing DCI format or the definition of one or more existing DCI format fields may be changed to allow the DCI control message to explicitly indicate to which carrier the grant corresponds.

The present system provides a multi-carrier control structure, wherein the PDCCH on one carrier may include PDCCH candidates that allocate resources amongst two or more carriers. In one implementation, the present system does not require modifications to existing Rel-8 DCI control message formats, and does not change the lengths of the existing Rel-8 DCI formats.

Moving forward, in LTE-A for example, in addition to the existing DCI formats, new DCI formats may be proposed to support new features (e.g., 8×8 MIMO and CoMP). As such, explicit bits may be added into any new DCI formats to signal the carriers. Even so, it may still be beneficial to implement the implicit PDCCH allocation of carriers as described in the present system. First, Rel-8 modes, such as transmit diversity and open-loop SM, may still be considered as fallback mode or transmission mode for a high mobility UA in an LTE-A system. Accordingly, a corresponding Rel-8 DCI format, such as format 1A, may still be used in such a system. Secondly, if explicit bits for identifying a carrier are defined in new DCI formats, for example, 3 bits, then any such bits may need to always be transmitted, and may often be wasted when only two carriers are aggregated, or there is no carrier aggregation. In that case, if the explicit bits vary, for example, from 0-3 bits, then such an implementation may increase blind decoding. In contrast, if the number of any such explicit bits is specified semi-statically for different carrier aggregation deployment, then the numbers of variations of DCI formats may increase substantially.

Other Solutions

In some embodiments, the set of configured carriers is the set of carriers used for actual data transmission and reception. In some embodiments a carrier may be configured but not activated. To this end, in some cases, after a UA is configured to use multiple carriers, the configured carriers can be activated or deactivated by sending activation signals from the access device to the UA (i.e., via MAC signaling or physical signaling). In at least some embodiments where activation signals are not received by a UA (i.e., activation/deactivation is not applied), configured carriers are always activated (i.e., default is for carriers to be active). The main purpose of activation/deactivation is to turn on/off UA transmission/reception more frequently based on actual data activity, which saves UA battery power. MAC signaling or physical signaling is faster than RRC signaling and therefore is more optimized Nevertheless, RRC signaling may be used in some cases.

FIG. 21 is a flowchart showing an example method 2100 for identifying resource grant of one or more carriers based on activation signals. The example method 2100 can be performed at a UA 10. The process starts at step 2110. At step 2120, an activation signal is received at a UA 10, where multiple configured carriers may be used for data transmission. In some embodiments, the activation signal can be included in MAC signaling or physical signaling. At step 2130, the activation signal is decoded to identify active carriers) and/or deactivated carrier(s) of the multiple carriers. At decisional step 2140, the UA 10 decides whether a carrier from among the configured carriers is active. If the carrier is deactivated, in at least some embodiments, the UA 10 will not monitor PDCCH candidates allocated to the deactivated carrier because PDSCH or PUSCH resources will not be scheduled on the deactivated carrier. The UA can ignore CCE subset candidates associated with the deactivated carrier and return to step 2110. If the carrier is active, the UA 10 proceeds to step 2150 where a number of CCE subset candidates are identified to decode. At 2160, up to the identified number of CCE subset candidates are decoded to identify the resource grant.

When a paired DL and UL carrier has a different status for UL and DL (i.e., DL carrier is deactivated but the linked UL carrier is activated, or vice versa), a UA can still be programmed to monitor PDCCH candidates linked to the DL carrier or UL carrier. Consequently, the total amount of PDCCH candidates can be increased as a function of the number of activated carriers. In other words, N in the tables shown in FIGS. 17 and 18 can be defined as the number of activated carriers. If DL and UL carriers are activated/deactivated independently, N can be the maximum of the number of activated DL carriers and the number of activated UL carriers.

Since only DCI 0 is used for UL grants, when an UL carrier is activated, the corresponding paired DL carrier is deactivated. In at least some embodiments, when at least one carrier is identified to be active at step 2140, the UA 10 can proceed to an optional decisional step 2145 to determine whether a UL carrier is active but the pared DL carrier is not active. If yes, the UA may be programmed to only perform blind decoding for the DCI 0 format size at an optional step 2155, which would reduce the required number of blind decodings by half. Otherwise, the UE may perform blind decoding for all associated DCI formats to identify CCE subset candidates at 2150.

Depending on the design of the search spaces for multiple component carriers, it may be possible for PDCCH candidates to overlap for more than one carrier in terms of CCE location. As mentioned above, one solution to this problem is to define PDCCH candidates so that they only correspond to one carrier in the event of overlap.

In some embodiments, when a PDCCH candidate for a first carrier overlaps with a PDCCH candidate for a second carrier, the DCI control message may be modified to include a carrier indicator field (CIF) that indicates to which carrier a PDCCH candidate belongs. For example, in some embodiments the CIF may be 3 bits, where each value of the CIF corresponds to a particular carrier.

FIG. 22A is a flowchart showing an example method 2220A for identifying a resource grant of one or more carriers based on a carrier identification field. The example method 2220A can be performed at a UA that has multiple carrier capability. The process starts at step 2210. At step 2220, the UA determines the locations of the PDCCH candidates (or CCE subset candidates) for each carrier from among multiple carriers. It is to be understood that the locations of the PDCCH candidates can also be determined for each carrier by the access device before transmission. At step 2230, information from PDCCH is received at the UA, where the information includes a DCI message. At 2240, one or more CCE subset candidates transmitted on the PDCCH are identified by the UA. At decisional step 2250A, for the identified one or more CCE subset candidates, the UA determines whether each of the CCE subset candidates corresponds to only one carrier. If not, i.e., a single PDCCH candidate corresponds to more than one carrier, the UA decodes the DCI message by identifying a CIF within the DCI message at step 2270A. It will be understood that in the case that a CCE subset candidate corresponds to more than one carrier, the access device can transmit the DCI control message that includes the CIF, and the CIF indicates the carrier corresponding to the PUSCH/PDSCH. At step 2280A, the UA uses the CIF to identify a carrier associated with each of the identified CCE subset candidates. In the event that a single PDCCH candidate only corresponds to one carrier, the process 2200A proceeds to step 2260A, the UA 10 decodes the DCI control message assuming the CIF is not included, and uses the location of the PDCCH candidate to implicitly determine the PUSCH/PDSCH. It is to be understood that in such case, the access device transmits a DCI control message that does not include the CIF and the location of the PDCCH candidate implicitly corresponds to the PUSCH/PDSCH.

FIG. 22B is a flowchart showing an example method 2200B for identifying a resource grant of one or more carriers based on a carrier identification field T\CIF) within each DCI message corresponding to a specific aggregation level. The method 2200B can be performed at a UA 10 that has multiple carrier capability. Steps 2210, 2220, 2230 and 2240 of the method 2200B are substantially similar to the first four steps that are performed in method 2200A. At decisional step 2250B, the UE decides whether at least one CCE subset candidate at a specific aggregation level corresponds to only one carrier, or in other words, whether there is no overlap for at least one PDCCH candidate at a particular aggregation level. If at least one CCE subset candidate at a specific aggregation level corresponds to only one carrier, at step 2260B, the UA 10 may identify a carrier associated with the CCE subset candidate at the specific aggregation level for a subframe without identifying a CIF. Otherwise, the CIF is included in all DCI control messages for the particular aggregation level transmitted at a specific subframe. Accordingly, the process proceeds to step 2270B, at which the UA 10 decodes the DCI message corresponding to a specific aggregation level by identifying a CIF for a subframe. At step 2280B, the UA uses the identified CIFs to identify carriers associated with the CCE subset candidates.

FIG. 22C is a flowchart showing an example method 2200C for identifying a resource grant of one or more carriers based on a CIF within each DCI message corresponding to all aggregation levels. The method 2200C can be performed at a UA 10 that has multiple carrier capability. Steps 2210, 2220, 2230 and 2240 of the method 2200B are substantially similar to the first four steps that are performed in methods 2200A-B. At decisional step 2250C, the UE decides whether at least one CCE subset candidate at any aggregation level corresponds to only one carrier, or in other words, whether there is no overlap for at least one PDCCH candidate at any aggregation level. If at least one CCE subset candidate at any aggregation level corresponds to only one carrier, at step 2260C, the UA may identify a carrier associated with the CCE subset candidate at all the aggregation levels for a subframe without identifying any CIF. Otherwise, the CIF is included in all DCI control messages for any aggregation level transmitted at a specific subframe. Accordingly, the process proceeds to step 2270C, at which the UA 10 decodes the DCI messages at all aggregation levels by identifying a CIF within each DCI message for a subframe. At step 2280C, the UA 10 uses the identified CIFs to identify carriers associated with the CCE subset candidates.

In some embodiments, the inclusion of the CIF can be applied significantly to the UA 10 specific search space. Such a scheme allows the CIF to only be included in the DCI control message when there is ambiguity as to which carrier the PDCCH candidate belongs. This reduces control channel overhead compared to schemes where the CIF is always included in the DCI control message and allows a search space to be completely shared between carriers, where the CIF is never included in the DCI control message.

Figure 13:
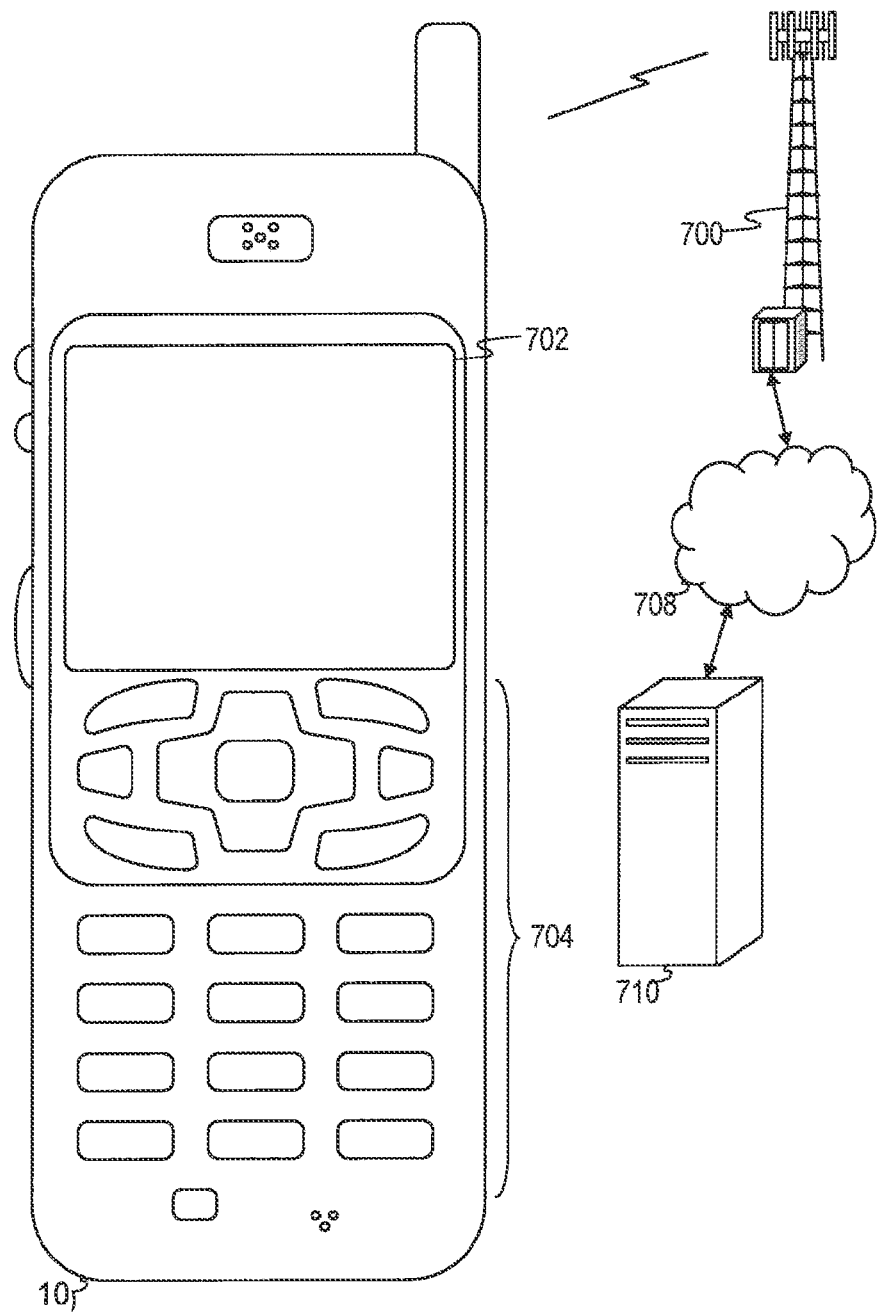
FIG. 13 is a diagram of a wireless communications system including a UA operable for some of the various embodiments of the disclosure.

FIG. 13 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over the air, for example, from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 14:
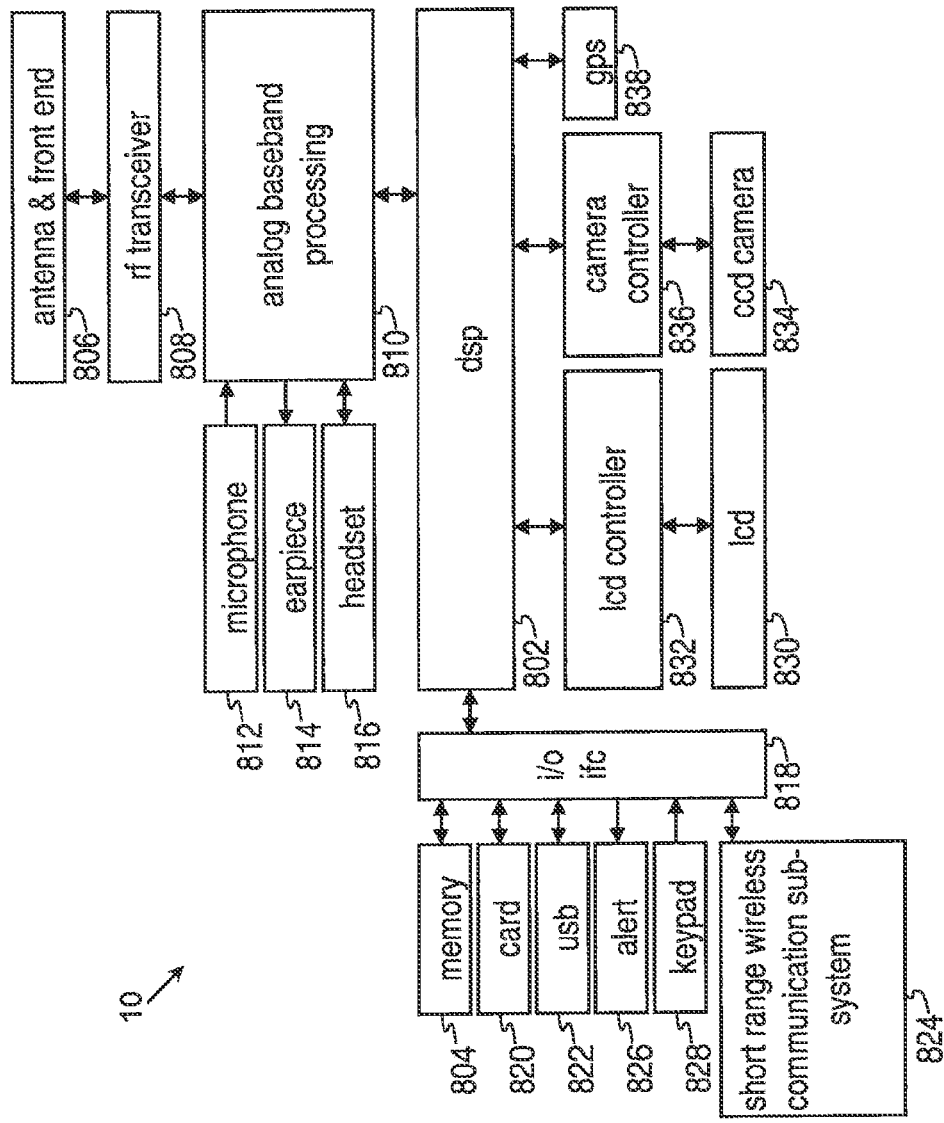
FIG. 14 is a block diagram of a UA operable for some of the various embodiments of the disclosure.

FIG. 14 shows a block diagram of the UA 10. While a variety of known components of UAs 110 are depicted, in an embodiment, a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch-sensitive screen. In an embodiment, the DSP 802 may communicate directly with the memory 804 without passing through the input/output interface 818.

The DSP 802, or some other form of controller or central processing unit, operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media, like the removable memory card 820, or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions, a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the antenna and front end unit 806, and the analog baseband processing unit 810 may be combined in one or more processing units and/or application specific integrated circuits (ASICs).

The analog baseband processing unit 810 may provide various analog processing of inputs and outputs, for example, analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example, by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example, in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example, in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 15:
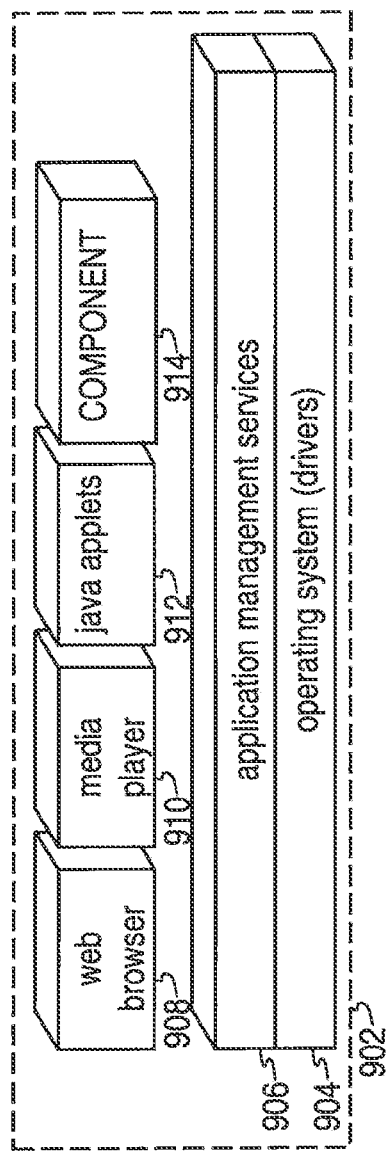
FIG. 15 is a diagram of a software environment that may be implemented on a UA operable for some of the various embodiments of the disclosure.

FIG. 15 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 15 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

Figure 16:
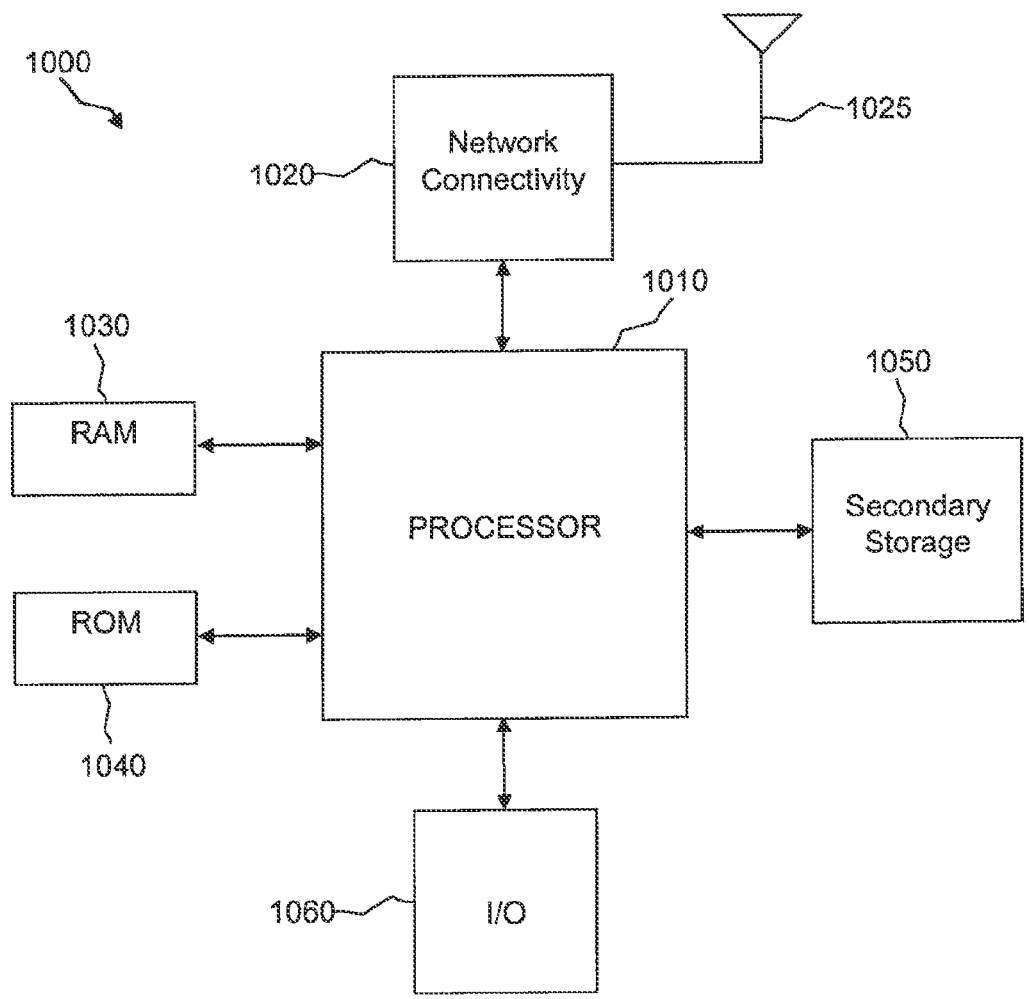
FIG. 16 is an illustrative general purpose computer system suitable for some of the various embodiments of the disclosure.

The UA 10, access device 12, and other components described above might include a processing component that is capable of executing instructions related to the actions described above. FIG. 16 illustrates an example of a system 1000 that includes a processing component 1010 suitable for implementing one or more embodiments disclosed herein. In addition to the processor 1010 (which may be referred to as a central processor unit (CPU or DSP)), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of, or in addition to, being a component of the network connectivity devices 1020. Some or all of the I/O devices 1060 may be substantially similar to various components depicted in the previously described drawing of the UA 10, such as the display 702 and the input 704, shown in FIG. 13.

The following 3rd Generation Partnership Project (3GPP) Technical Specifications (TS) are incorporated herein by reference: TS 36.321, TS 36.331, and TS 36.300, TS 36.211, TS 36.212 and TS 36.213.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this disclosure, the following claims are made:

What is claimed is:

1. A method for processing a control channel at a user agent (UA) to identify at least one of an uplink and a downlink resource allocated by a resource grant within a multi-carrier communication system wherein resource grants are specified by control channel element (CCE) subset candidates wherein the carriers used for data transmission and reception are configured carriers, the method comprising the steps of:
   receiving activation signals specifying active and deactivated carriers from among the configured carriers;
   for active carriers:
      (i) identifying a number of CCE subset candidates to decode; and
      (ii) decoding up to the identified number of CCE subset candidates in an attempt to identify the resource grant; and
   for deactivated carriers, ignoring CCE subset candidates associated with the deactivated carriers.

2. The method of claim 1 wherein the activation signals indicate that an uplink carrier is active and that a corresponding paired downlink carrier is deactivated and wherein the step of identifying CCE subset candidates includes identifying only candidates associated with a downlink control information (DCI) 0 format for an active uplink carrier for decoding.

3. The method of claim 1, wherein the activation signals are included in a medium access control (MAC) signaling.

4. The method of claim 3, further comprising decoding the activation signals.

5. The method of claim 1, wherein the activation signals are included in a physical signaling.

6. The method of claim 1, wherein the CCE subset candidates are identified based on an index the corresponding carrier.

7. The method of claim 1, wherein the identified resource grant corresponds to a downlink control information (DCI) message.

8. A user equipment for processing a control channel at a user agent (UA) to identify at least one of an uplink and a downlink resource allocated by a resource grant within a multi-carrier communication system wherein resource grants are specified by control channel element (CCE) subset candidates wherein the carriers used for data transmission and reception are configured carriers, comprising:
one or more processors configured to:
receive activation signals specifying active and deactivated carriers from among the configured carriers;
for active carriers:
(i) identify a number of CCE subset candidates to decode; and
(ii) decode up to the identified number of CCE subset candidates in an attempt to identify the resource grant; and
for deactivated carriers, ignore CCE subset candidates associated with the deactivated carriers.

9. The user equipment of claim 8, wherein the activation signals indicate that an uplink carrier is active and that a corresponding paired downlink carrier is deactivated and wherein identifying CCE subset candidates includes identifying only candidates associated with a downlink control information (DCI) 0 format for an active uplink carrier for decoding.

10. The user equipment of claim 8, wherein the activation signals are included in a medium access control (MAC) signaling.

11. The user equipment of claim 8, wherein the activation signals are included in a physical signaling.

12. The user equipment of claim 11, the one or more processors further configured to decode the activation signals.

13. The user equipment of claim 8, wherein the CCE subset candidates are identified based on an index the corresponding carrier.

14. The user equipment of claim 8, wherein the identified resource grant corresponds to a downlink control information (DCI) message.

* * * * *